(12) United States Patent
Huppi et al.

(10) Patent No.: US 7,633,076 B2
(45) Date of Patent: Dec. 15, 2009

(54) AUTOMATED RESPONSE TO AND SENSING OF USER ACTIVITY IN PORTABLE DEVICES

(75) Inventors: Brian Huppi, San Francisco, CA (US); Anthony M. Fadell, Portola Valley, CA (US); Derek Barrentine, Cupertino, CA (US); Daniel Freeman, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 385 days.

(21) Appl. No.: 11/586,862

(22) Filed: Oct. 24, 2006

(65) Prior Publication Data

US 2007/0075965 A1 Apr. 5, 2007

Related U.S. Application Data

(63) Continuation-in-part of application No. 11/241,839, filed on Sep. 30, 2005, and a continuation-in-part of application No. 11/240,788, filed on Sep. 30, 2005.

(51) Int. Cl.
*G01N 21/86* (2006.01)
*G01V 8/00* (2006.01)
*G01N 21/88* (2006.01)

(52) U.S. Cl. .............................. 250/559.36; 340/686.6; 381/107; 345/169

(58) Field of Classification Search ............ 250/559.36; 340/686.6; 381/107; 345/169
See application file for complete search history.

(56) References Cited

U.S. PATENT DOCUMENTS

| | | | |
|---|---|---|---|
| 5,103,085 A | 4/1992 | Zimmerman | |
| 5,528,266 A | 6/1996 | Arbeitman et al. | |
| 5,684,294 A | 11/1997 | Kouhi | |
| 6,373,612 B1 | 4/2002 | Hoffman et al. | |
| 6,520,013 B1 | 2/2003 | Wehrenberg | |
| 6,583,676 B2 | 6/2003 | Krah et al. | |
| 6,601,012 B1 | 7/2003 | Horvitz et al. | |
| 6,664,744 B2 | 12/2003 | Dietz | |

(Continued)

FOREIGN PATENT DOCUMENTS

EP 1185058 3/2002

(Continued)

OTHER PUBLICATIONS

Agilent Technologies Inc., "Agilent unveils optical proximity sensor for mobile appliances", http:/www.embeddedstar.com/press/content/2004/8/embedded16015.html, (Aug. 31, 2004),2 pages.

(Continued)

*Primary Examiner*—Seung C Sohn
(74) *Attorney, Agent, or Firm*—Blakely, Sokoloff, Taylor & Zafman LLP

(57) ABSTRACT

The various methods and devices described herein relate to devices which, in at least certain embodiments, may include one or more sensors for providing data relating to user activity and at least one processor for causing the device to respond based on the user activity which was determined, at least in part, through the sensors. The response by the device may include a change of state of the device, and the response may be automatically performed after the user activity is determined.

18 Claims, 17 Drawing Sheets

U.S. PATENT DOCUMENTS

| | | | |
|---|---|---|---|
| 6,812,466 | B2 | 11/2004 | O'Connor et al. |
| 6,822,635 | B2 | 11/2004 | Shahoian et al. |
| 6,947,571 | B1 | 9/2005 | Rhoads et al. |
| 6,956,564 | B1 | 10/2005 | Williams |
| 7,016,705 | B2 | 3/2006 | Bahl et al. |
| 7,019,622 | B2 | 3/2006 | Orr et al. |
| 7,171,221 | B1 | 1/2007 | Amin et al. |
| 7,522,065 | B2 | 4/2009 | Falcon |
| 2001/0031633 | A1 | 10/2001 | Tuomela et al. |
| 2002/0167488 | A1 | 11/2002 | Hinckley et al. |
| 2003/0095096 | A1 | 5/2003 | Robbin et al. |
| 2004/0180649 | A1 | 9/2004 | Vogel et al. |
| 2004/0224638 | A1 | 11/2004 | Fadell et al. |
| 2004/0233153 | A1 | 11/2004 | Robinson |
| 2004/0245438 | A1 | 12/2004 | Payne et al. |
| 2005/0219223 | A1 | 10/2005 | Kotzin et al. |
| 2005/0219228 | A1 | 10/2005 | Alameh et al. |
| 2005/0221791 | A1 | 10/2005 | Angelhag |
| 2006/0017692 | A1 | 1/2006 | Wehrenberg et al. |
| 2006/0026521 | A1 | 2/2006 | Hotelling et al. |
| 2006/0026535 | A1 | 2/2006 | Hotelling et al. |
| 2006/0060762 | A1 | 3/2006 | Chan et al. |
| 2006/0097991 | A1 | 5/2006 | Hotelling et al. |
| 2006/0117108 | A1 | 6/2006 | Salisbury et al. |
| 2006/0146012 | A1 | 7/2006 | Arneson et al. |
| 2006/0161870 | A1 | 7/2006 | Hotelling et al. |
| 2006/0161871 | A1 | 7/2006 | Hotelling et al. |
| 2006/0164241 | A1 | 7/2006 | Makela et al. |
| 2006/0290921 | A1 | 12/2006 | Hotelling |
| 2007/0075965 | A1 | 4/2007 | Huppi et al. |
| 2007/0085157 | A1 | 4/2007 | Fadell et al. |
| 2007/0099574 | A1 | 5/2007 | Wang |
| 2008/0006762 | A1 | 1/2008 | Fadell et al. |
| 2008/0090617 | A1 | 4/2008 | Sutardja |
| 2008/0113618 | A1 | 5/2008 | De Leon et al. |

FOREIGN PATENT DOCUMENTS

| | | |
|---|---|---|
| EP | 1335430 | 8/2003 |
| EP | 1355223 | 10/2003 |
| EP | 1452988 | 9/2004 |
| EP | 1507132 | 2/2005 |
| EP | 1507196 | 2/2005 |
| EP | 1650938 | 4/2006 |
| GB | 2346500 | 8/2000 |
| JP | 05-323277 | 12/1993 |
| JP | 2007-163872 | 6/2007 |
| WO | WO-2004/093045 | 10/2004 |
| WO | WO-2005/101176 | 10/2005 |

OTHER PUBLICATIONS

Apple Inc., "PCT Notification of Transmittal of the International Search Report and the Written Opinion of the International Searching Authority", PCT/US2007/022335, (Feb. 18, 2008).

Kennedy, "Methods and Apparatuses for Configuration Automation", U.S. Appl. No. 10/805,144, 59 pages.

Roos, Gina "Agilent's new proximity sensor beats the fumble-fingered competition hands down . . . literally", eeProductCenter, URL:http://www.eeproductcenter.com/showArticle.jhtml?articleID_46200544, (Sep. 1, 2004),3 pages.

Universial Remote Control, Inc., "MX-950 (The Aurora)", www.unversalremote.com, (2005).

Universal Remote Control, Inc., "All Complete Control Remotes Now Use Narrow Band RF", http://www.universalremote.com/corporate/press_release.php?press=13, (2008).

Universal Remote Control, Inc., "Operating System with the Aurora MX-950", MX-950 Owners Manual, (2005).

Apple Inc., "PCT Search Report and Written Opinion mailed Jul. 3, 2008", PCT/US2007/023124, 14 pages.

PCT Search Report mailed Aug. 21, 2008; PCT/US2007/026130.

CNET News.com, "Reinventing the Scroll Wheel," Photo 1, downloaded from the Internet at: http://news.com.com/2300-1041_3-6107951-1.html?tag=ne.gall.pg, Aug. 22, 2006, 2 pages.

CNET News.com, "Reinventing the Scroll Wheel," Photo 2, downloaded from the Internet at: http://news.com.com/2300-1041_3-6107951-2.html?tag=ne.gall.pg, Aug. 22, 2006, 2 pages.

CNET News.com, "Reinventing the Scroll Wheel," Photo 3, downloaded from the Internet at: http://news.com.com/2300-1041_3-6107951-3.html?tag=ne.gall.pg, Aug. 22, 2006, 2 pages.

CNET News.com, "Reinventing the Scroll Wheel," Photo 4, downloaded from the Internet at: http://news.com.com/2300-1041_3-6107951-4.html?tag=ne.gall.pg, Aug. 22, 2006, 2 pages.

CNET News.com, "Reinventing the Scroll Wheel," Photo 5, downloaded from the Internet at: http://news.com.com/2300-1041_3-6107951-5.html?tag=ne.gall.pg, Aug. 22, 2006, 2 pages.

CNET News.com, "Reinventing the Scroll Wheel," Photo 6, downloaded from the Internet at: http://news.com.com/2300-1041_3-6107951-6.html?tag=ne.gall.pg, Aug. 22, 2006, 2 pages.

CNET News.com, "Reinventing the Scroll Wheel," Photo 7, downloaded from the Internet at: http://news.com.com/2300-1041_3-6107951-7.html?tag=ne.gall.pg, Aug. 22, 2006, 2 pages.

CNET News.com, "Reinventing the Scroll Wheel," Photo 8, downloaded from the Internet at: http://news.com.com/2300-1041_3-6107951-8.html?tag=ne.gall.pg, Aug. 22, 2006, 2 pages.

"Apple Inc.", *International Preliminary Report on Patentability* mailed May 28, 2009; PCT Application No. PCT/US2007/023124.

"Apple Inc.", *International Preliminary Report on Patentability* mailed May 7, 2009; PCT Application No. PCT/US2007/022335.

"Apple Inc.", *International Preliminary Report on Patentability* mailed Jul. 16, 2009; PCT Application No. PCT/US2007/026164.

"Apple Inc.", *International Preliminary Report on Patentability* mailed Jul. 16, 2009; PCT Application No. PCT/US2007/026141.

"Proximity Sensor Demo Kit User Guide, Version 0.62-Preliminary", *Integration Associates, Inc.*; 2004, 17 pages.

Apple Inc., *International Preliminary Report on Patentability* mailed Jul. 16, 2009; PCT Application No. PCT/US2007/026130.

AUTOMATED RESPONSE TO AND SENSING OF USER ACTIVITY IN PORTABLE DEVICES

CROSS REFERENCE TO RELATED APPLICATIONS

This application is a Continuation-in-Part of U.S. patent application Ser. No. 11/241,839, filed Sep. 30, 2005, titled "PROXIMITY DETECTOR IN HANDHELD DEVICE" and U.S. patent application Ser. No. 11/240,788, filed Sep. 30, 2005, titled "PROXIMITY DETECTOR IN HANDHELD DEVICE" which are incorporated herein by reference in their entireties.

FIELD OF THE INVENTION

This invention relates to the field of portable devices and, in particular, to systems and methods for sensing or determining user activities and responding to the user's activities.

BACKGROUND OF THE INVENTION

Portable devices, such as cell phones, are becoming increasingly common. These portable devices have grown more complex over time, incorporating many features including, for example, MP3 player capabilities, web browsing capabilities, capabilities of personal digital assistants (PDAs) and the like.

The battery life of these portable devices, however, can be limited. Often, the primary draw of battery power is the display device for these portable devices and, in particular, the backlight, which can be used to illuminate the display device. In many current portable devices, an exemplary process 10 for illuminating the display is shown in FIG. 1. In this process, the backlight is activated (e.g. turned on to generate light) when a user enters a key input into the portable device as shown in operation 12. A timer is started at operation 14 in response to activating the backlight, and the portable device determines, at operation 16, whether a time out of the timer has occurred. If the portable device receives a user key input at operation 18, the timer restarts (in operation 14) and the process continues as described above. If the portable device does not receive a user input while the timer is counting, the time out will occur, and the backlight is deactivated at operation 20.

In addition, users often inadvertently enter key inputs on the input device of the portable device, which can result in the telephone performing operations which the user did not intend. For example, the backlight may illuminate, a telephone number may be dialed, a ring setting may be changed, etc., because the user accidentally contacts a key on the input device. The inadvertent entry of an input is particularly troublesome for a touch screen device, especially one which may receive an inadvertent input when a user has the portable device placed next to the user's ear.

SUMMARY OF THE DESCRIPTION

The various methods and devices described herein relate to devices which, in at least certain embodiments, may include one or more sensors, such as a proximity sensor, for providing data relating to user activity and at least one processor for causing the device to respond based on the user activity which was determined, at least in part, through the sensors. The response by the device may include a change of state of the device, and the response may be automatically performed after the user activity is determined.

According to one embodiment of the inventions, a method includes receiving data from at least one sensor, such as a proximity sensor, at a device, analyzing the data to determine activity of a user of the device, and modifying, in response to the analyzing, at least one setting of the device such as a setting relating to how input data from an input device is processed. The device may be a telephone, such as a cell phone, or an integrated telephone and media player, or other types of devices which can include the sensor and logic to process data from the sensor and the input device may be a keypad or a multi-touch input panel. The sensors may be any one of a variety of sensors including, for example, a proximity sensor, a temperature sensor, an accelerometer, a light sensor, a position determination device, an orientation determination device, a radio frequency electromagnetic wave sensor, a touch input panel, a motion sensor, or a sound sensor. In certain embodiments, the device may include a plurality of sensors which together provide data to at least one processor which analyzes the data to determine activity of the user. In at least certain embodiments, the analyzing may use an artificial intelligence process which includes a comparison of data, derived from the one or more sensors, to a threshold; for example, the data from a proximity sensor may be compared to a threshold value which represents a distance between a portion of the device and the user's ear or head. The data from a sensor may represent an analog value detected by the sensor; the analog value may indicate any one of a variety of analog values including, for example, a distance, a temperature, a light intensity, a measurement of motion or orientation, a measurement of sound intensity or an RF electromagnetic measurement. The artificial intelligence process, in at least certain embodiments, may be required to receive the data and to select an interpretation of the data from a set of possible interpretations, and the interpretation which is selected will in turn be used to decide how to modify the at least one setting. The setting which is modified may be any one of a variety of settings including, for example, a setting of a display illuminator, a setting of a sound input or sound output parameter, a setting of a state of an input device relative to receipt of user input, a setting of a communication parameter, a setting of a processor, or a setting of the mode of the device (e.g. cell phone mode or media player mode).

Various devices which perform one or more of the foregoing methods and machine readable media which, when executed by a processing system, cause the processing system to perform these methods, are also described.

According to another embodiment of the inventions, a method of operating a portable device having a hinge includes sensing a state of the hinge, analyzing data from a proximity sensor when the state of the hinge shows that the portable device is in an open configuration, and modifying at least one setting of the portable device in response to the analyzing. In at least certain embodiments, when the state of the hinge indicates that the portable device is in a closed configuration, the data from the proximity sensor is either ignored or not processed to determine whether a user's head or ear is near the proximity sensor; further, when in this closed configuration, the proximity sensor is placed in a reduced power consumption state. An implementation of one or more of these methods may be performed by a cellular telephone which typically includes a first housing, a second housing, a hinge which couples the first housing to the second housing, a hinge state detector to detect a state of the hinge, a proximity sensor, and at least one processor coupled to the proximity sensor and to the hinge state detector.

Other methods, devices and machine readable media are also described.

BRIEF DESCRIPTION OF THE DRAWINGS

The invention is described by way of example with reference to the accompanying drawings, wherein.

DETAILED DESCRIPTION

Figure 1:
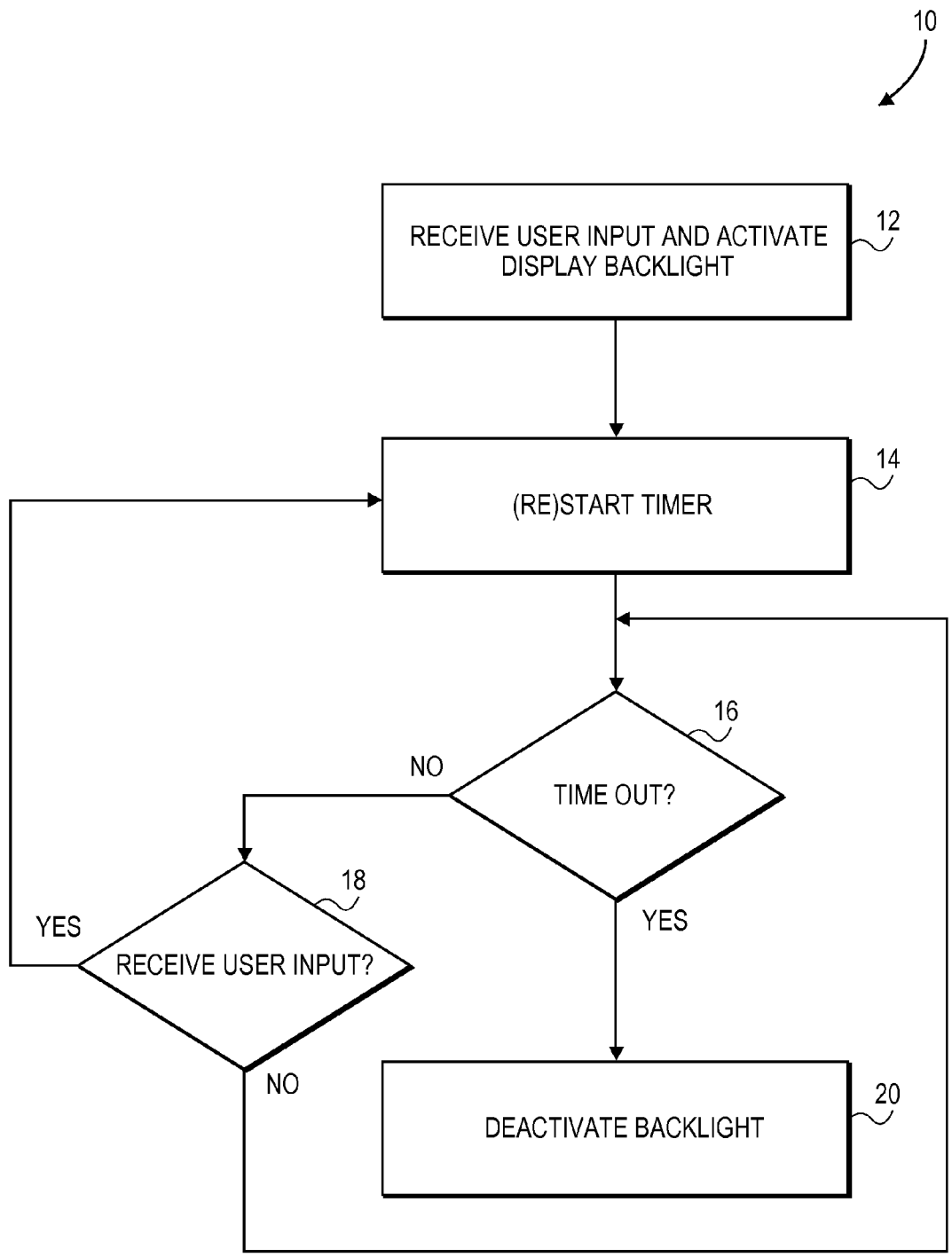
FIG. 1 is flow chart of a prior art method for responding to user input and controlling the backlight of a display in response to the user input.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a through understanding of various embodiments of the present invention. However, in certain instances, well-known or conventional details are not described in order to provide a concise discussion of embodiments of the present inventions.

Some portions of the detailed descriptions which follow are presented in terms of algorithms which include operations on data stored within a computer memory. An algorithm is generally a self-consistent sequence of operations leading to a desired result. The operations typically require or involve physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, can refer to the action and processes of a data processing system, or similar electronic device, that manipulates and transforms data represented as physical (electronic) quantities within the system's registers and memories into other data similarly represented as physical quantities within the system's memories or registers or other such information storage, transmission or display devices.

The present invention can relate to an apparatus for performing one or more of the operations described herein. This apparatus may be specially constructed for the required purposes, or it may comprise a general purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs, and magnetic-optical disks, read-only memories (ROMs), random access memories (RAMs), erasable programmable ROMs (EPROMs), electrically erasable programmable ROMs (EEPROMs), magnetic or optical cards, or any type of media suitable for storing electronic instructions, and each coupled to a bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

At least certain embodiments of the present inventions include one or more sensors to monitor user activity. At least certain embodiments of the present inventions also include automatically changing a state of the portable device based on user activity, such as, for example, automatically activating or deactivating a backlight of a display device of the portable device or setting an input device of the portable device to a particular state, based on certain predetermined user activities.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod® or iPod Nano® media player from Apple Computer, Inc. of Cupertino, Calif., a touch screen input device, pushbutton device, movable pointing input device or other input device. The media selection device may be used to select the media stored on the storage device and/or the remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s). Examples of a portable media player are described in published U.S. patent application numbers 2003/0095096 and 2004/0224638, both of which are incorporated herein by reference.

Embodiments of the inventions described herein may be part of other types of data processing systems, such as, for example, entertainment systems or personal digital assistants (PDAs), or general purpose computer systems, or special purpose computer systems, or an embedded device within another device, or cellular telephones which do not include media players, or devices which combine aspects or functions of these devices (e.g., a media player, such as an iPod®, combined with a PDA, an entertainment system, and a cellular telephone in one portable device).

Figure 2:
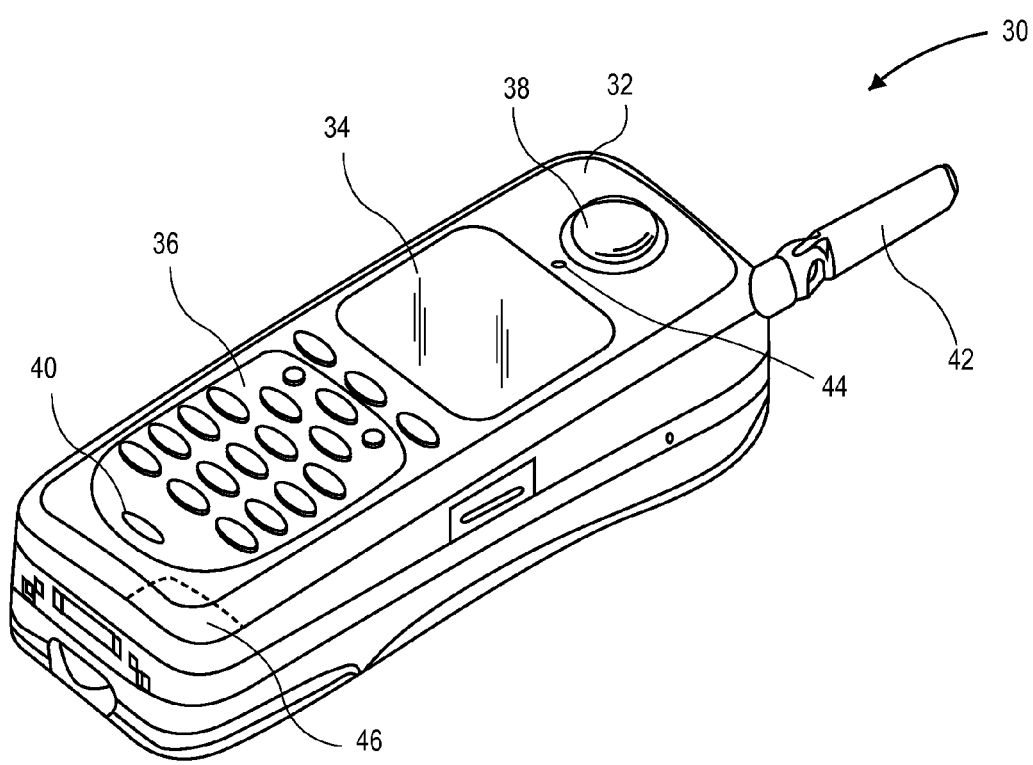
FIG. 2 is a perspective view of a portable device in accordance with one embodiment of the present invention.

FIG. 2 illustrates a portable device 30 according to one embodiment of the invention. FIG. 2 shows a wireless device in a telephone configuration having a "candy-bar" style. In FIG. 2, the wireless device 30 may include a housing 32, a display device 34, an input device 36 which may be an alphanumeric keypad, a speaker 38, a microphone 40 and an antenna 42. The wireless device 30 also may include a proximity sensor 44 and an accelerometer 46. It will be appreciated that the embodiment of FIG. 2 may use more or fewer sensors and may have a different form factor from the form factor shown in FIG. 2.

The display device 34 is shown positioned at an upper portion of the housing 32, and the input device 36 is shown positioned at a lower portion of the housing 32. The antenna 42 is shown extending from the housing 32 at an upper portion of the housing 32. The speaker 38 is also shown at an upper portion of the housing 32 above the display device 34. The microphone 40 is shown at a lower portion of the housing 32, below the input device 36. It will be appreciated that the speaker 38 and microphone 40 can be positioned at any location on the housing, but are typically positioned in accordance with a user's ear and mouth, respectively. The proximity sensor 44 is shown at or near the speaker 38 and at least partially within the housing 32. The accelerometer 46 is shown at a lower portion of the housing 32 and within the housing 32. It will be appreciated that the particular locations of the above-described features may vary in alternative embodiments.

The display device 34 may be, for example, a liquid crystal display (LCD) which does not include the ability to accept inputs or a touch input screen which also includes an LCD. The input device 36 may include, for example, buttons, switches, dials, sliders, keys or keypad, navigation pad, touch pad, touch screen, and the like.

Any well-known speaker, microphone and antenna can be used for speaker 38, microphone 40 and antenna 42, respectively.

Figure 7A:
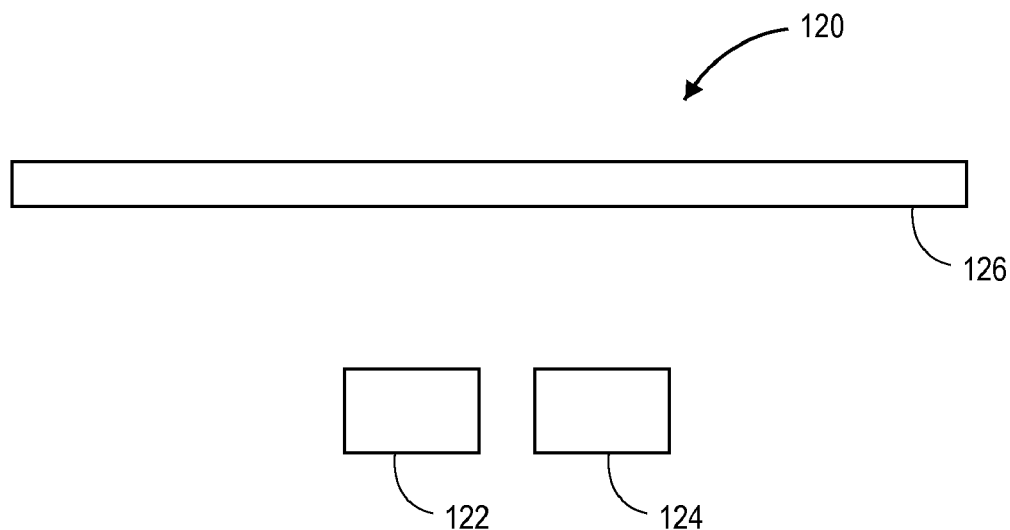
FIG. 7A is a schematic side view of a proximity sensor in accordance with one embodiment of the present invention.

The proximity sensor 44 may detect location (e.g. X, Y, Z), direction, speed, orientation (e.g., roll, pitch, yaw), etc. of objects relative to the wireless device 30. A location of an object relative to the wireless device can be represented as a distance in at least certain embodiments. The proximity sensor may generate location or movement data or both, which may be used to determine the location of objects relative to the portable device 30 and/or proximity sensor 44. An example of a proximity sensor is shown in FIG. 7A.

In addition, a processing device (not shown) is coupled to the proximity sensor(s) 44. The processing device may be used to determine the location of objects relative to the portable device 30 or proximity sensor 44 or both based on the location and/or movement data provided by the proximity sensor 44. The proximity sensor may continuously or periodically monitor the object location. The proximity sensor may also be able to determine the type of object it is detecting.

Additional information about proximity sensors can be found in U.S. patent application Ser. No. 11/241,839, titled "PROXIMITY DETECTOR IN HANDHELD DEVICE," and U.S. patent application Ser. No. 11/240,788, titled "PROXIMITY DETECTOR IN HANDHELD DEVICE;" U.S. patent application Ser. No. 11/165,958, titled "METHODS AND APPARATUS FOR REMOTELY DETECTING PRESENCE," filed Jun. 23, 2005; and U.S. Pat. No. 6,583,676, titled "PROXIMITY/TOUCH DETECTOR AND CALIBRATION CIRCUIT," issued Jun. 24, 2003, all of which are incorporated herein by reference in their entirety.

According to one embodiment, the accelerometer 46 is able to detect a movement including an acceleration or de-acceleration of the wireless device. The accelerometer 46 may generate movement data for multiple dimensions, which may be used to determine a direction of movement of the wireless device. For example, the accelerometer 46 may generate X, Y and Z axis acceleration information when the accelerometer 46 detects that the portable device is moved. In one embodiment, the accelerometer 46 may be implemented as described in U.S. Pat. No. 6,520,013, which is incorporated herein by reference in its entirety. Alternatively, the accelerometer 46 may be a KGF01 accelerometer from Kionix or an ADXL311 accelerometer from Analog Devices or other accelerometers which are known in the art.

In addition, a processing device (not shown) is coupled to the accelerometer(s) 46. The processing device may be used to calculate a direction of movement, also referred to as a movement vector of the wireless device 30. The movement vector may be determined according to one or more predetermined formulas based on the movement data (e.g., movement in X, Y and Z) provided by accelerometer 46. The processing device may be integrated with the accelerometer 46 or integrated with other components, such as, for example, a chipset of a microprocessor, of the portable device.

The accelerometer 46 may continuously or periodically monitor the movement of the portable device. As a result, an orientation of the portable device prior to the movement and after the movement may be determined based on the movement data provided by the accelerometer attached to the portable device.

Additional information about accelerometers can be found in copending U.S. patent application Ser. No. 10/986,730, filed Nov. 12, 2004, which is hereby incorporated herein by reference in its entirety.

The data acquired from the proximity sensor 44 and the accelerometer 46 can be combined together, or used alone, to gather information about the user's activities. The data from the proximity sensor 44, the accelerometer 46 or both can be used, for example, to activate/deactivate a display backlight, initiate commands, make selections, control scrolling or other movement in a display, control input device settings, or to make other changes to one or more settings of the device.

Figure 3:
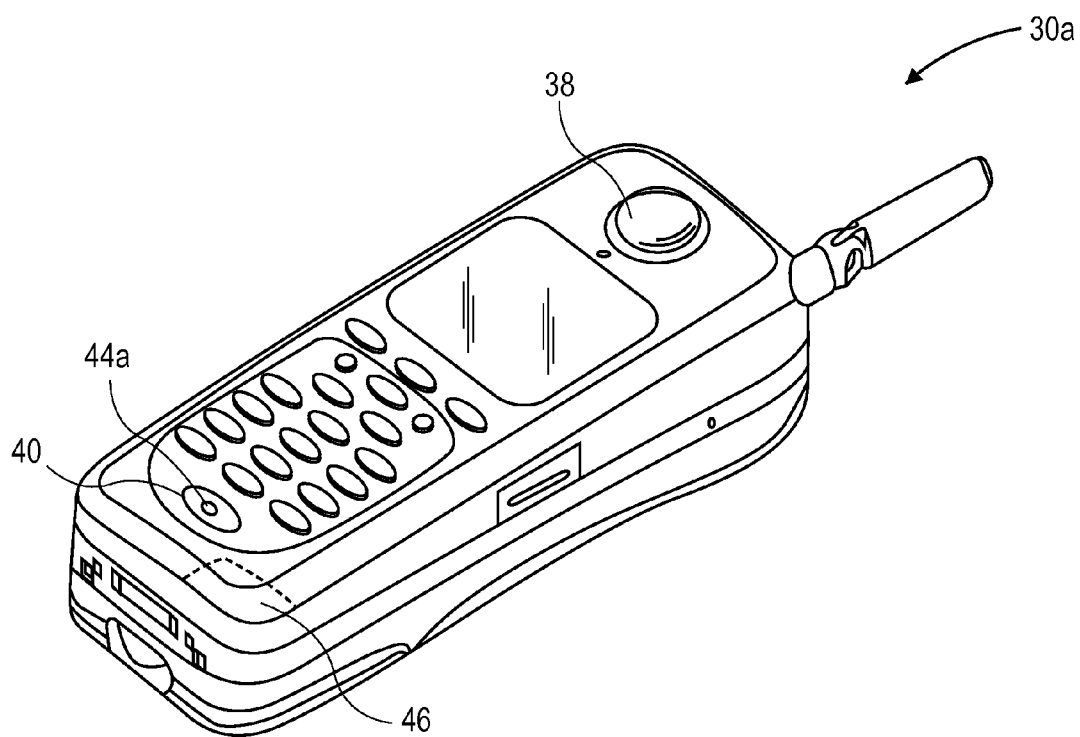
FIG. 3 is a perspective view of a portable device in accordance with one embodiment of the present invention.

FIG. 3 shows an alternative portable device 30a, which is similar to the portable device 30 illustrated in FIG. 2. The portable device 30a shown in FIG. 3 can differ from the portable device 30 shown in FIG. 2 in that the proximity sensor 44a (FIG. 3) is located at or near the microphone 40.

Figure 4:
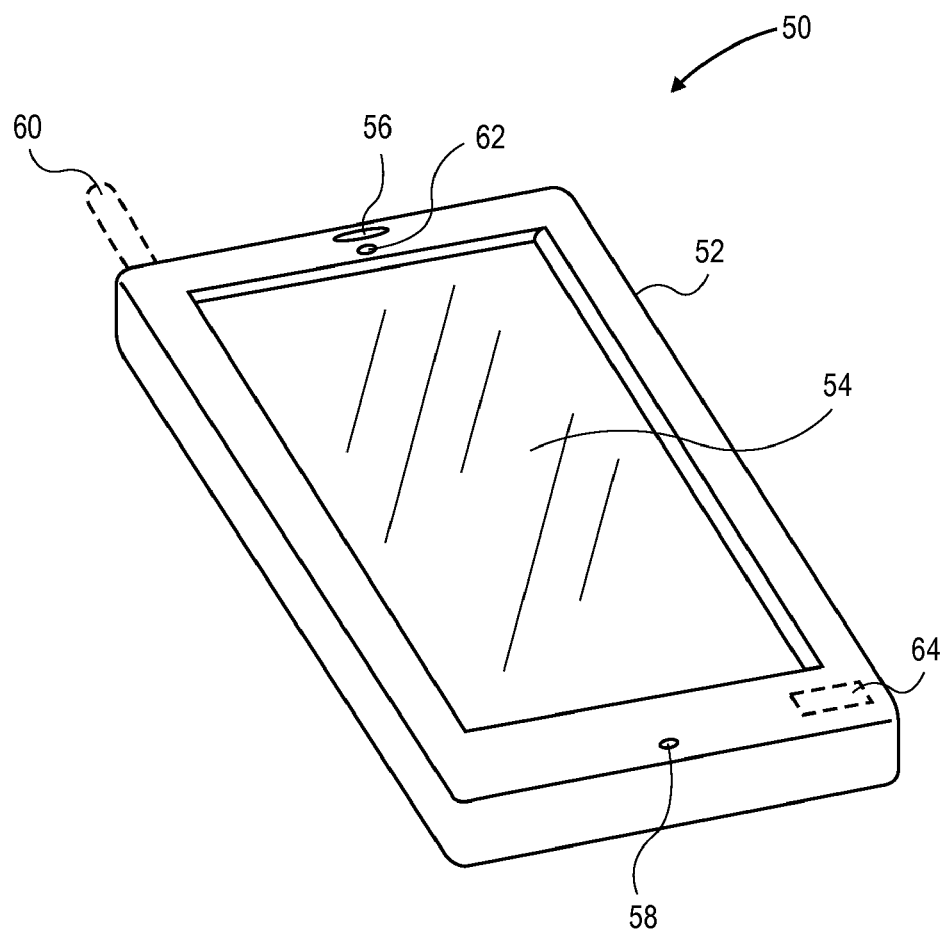
FIG. 4 is a perspective view of a portable device in accordance with one embodiment of the present invention.

FIG. 4 shows a portable device 50 in accordance with one embodiment of the invention. The portable device 50 may include a housing 52, a display/input device 54, a speaker 56, a microphone 58 and an optional antenna 60 (which may be visible on the exterior of the housing or may be concealed within the housing). The portable device 50 also may include a proximity sensor 62 and an accelerometer 64. The portable device 50 may be a cellular telephone or a device which is an integrated PDA and a cellular telephone or a device which is an integrated media player and a cellular telephone or a device which is both an entertainment system (e.g. for playing games) and a cellular telephone, or the portable device 50 may be other types of devices described herein. In one particular embodiment, the portable device 50 may include a cellular telephone and a media player and a PDA, all contained within the housing 52. The portable device 50 may have a form factor which is small enough that it fits within the hand of a normal adult and is light enough that it can be carried in one hand by an adult. It will be appreciated that the term "portable" means the device can be easily held in an adult user's hands (one or both); for example, a laptop computer and an iPod are portable devices.

In one embodiment, the display/input device 54 may include a multi-point touch input screen in addition to being a display, such as an LCD. In one embodiment, the multi-point touch screen is a capacitive sensing medium configured to detect multiple touches (e.g., blobs on the display from a user's face or multiple fingers concurrently touching or nearly touching the display) or near touches (e.g., blobs on the display) that occur at the same time and at distinct locations in the plane of the touch panel and to produce distinct signals representative of the location of the touches on the plane of the touch panel for each of the multiple touches. Additional information about multi-point input touch screens can be found in copending U.S. patent application Ser. No. 10/840,862, filed May 6, 2004 (see published U.S. patent application 20060097991), which is incorporated herein by reference in its entirety. A multi-point input touch screen may also be referred to as a multi-touch input panel.

A processing device (not shown) may be coupled to the display/input device 54. The processing device may be used to calculate touches on the touch panel. The display/input device 54 can use the detected touch (e.g., blob or blobs from a user's face) data to, for example, identify the location of certain objects and to also identify the type of object touching (or nearly touching) the display/input device 54.

The data acquired from the proximity sensor 62 and the display/input device 54 can be combined to gather information about the user's activities as described herein. The data from the proximity sensor 62 and the display/input device 54 can be used to change one or more settings of the portable device 50, such as, for example, change an illumination setting of the display/input device 54.

In one embodiment, as shown in FIG. 4, the display/input device 54 occupies a large portion of one surface (e.g. the top surface) of the housing 52 of the portable device 50. In one embodiment, the display/input device 54 consumes substantially the entire front surface of the portable device 50. In another embodiment, the display/input device 54 consumes, for example, at least 75% of a front surface of the housing 52 of the portable device 50. In alternative embodiments, the portable device 50 may include a display which does not have input capabilities, but the display still occupies a large portion of one surface of the portable device 50. In this case, the portable device 50 may include other types of input devices such as a QWERTY keyboard or other types of keyboard which slide out or swing out from a portion of the portable device 50.

Figure 5A:
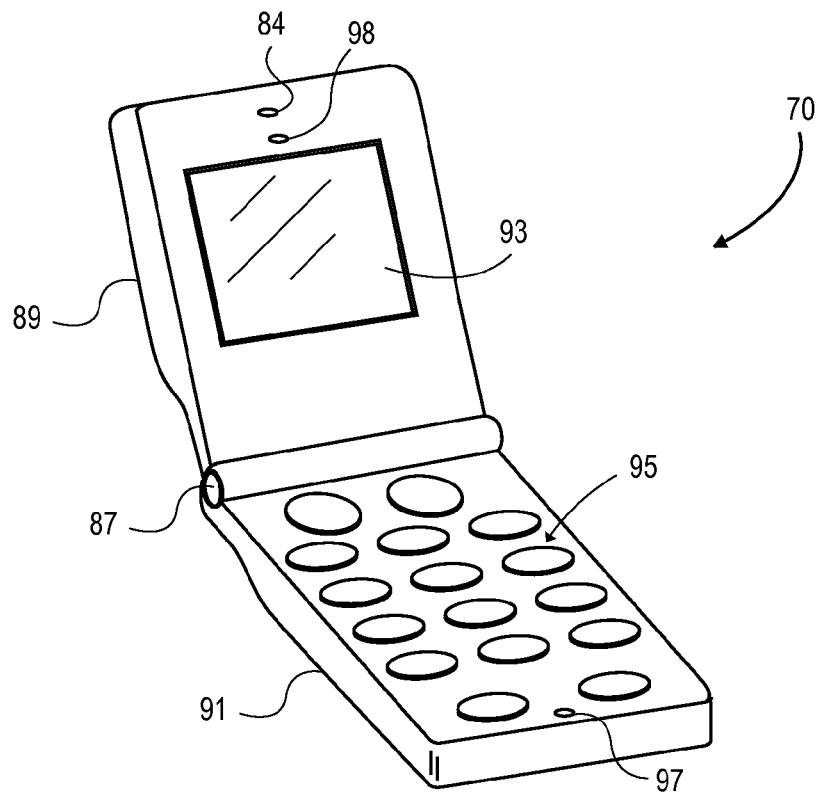
FIG. 5A is a perspective view of a portable device in a first configuration (e.g. in an open configuration) in accordance with one embodiment of the present invention.
Figure 5B:
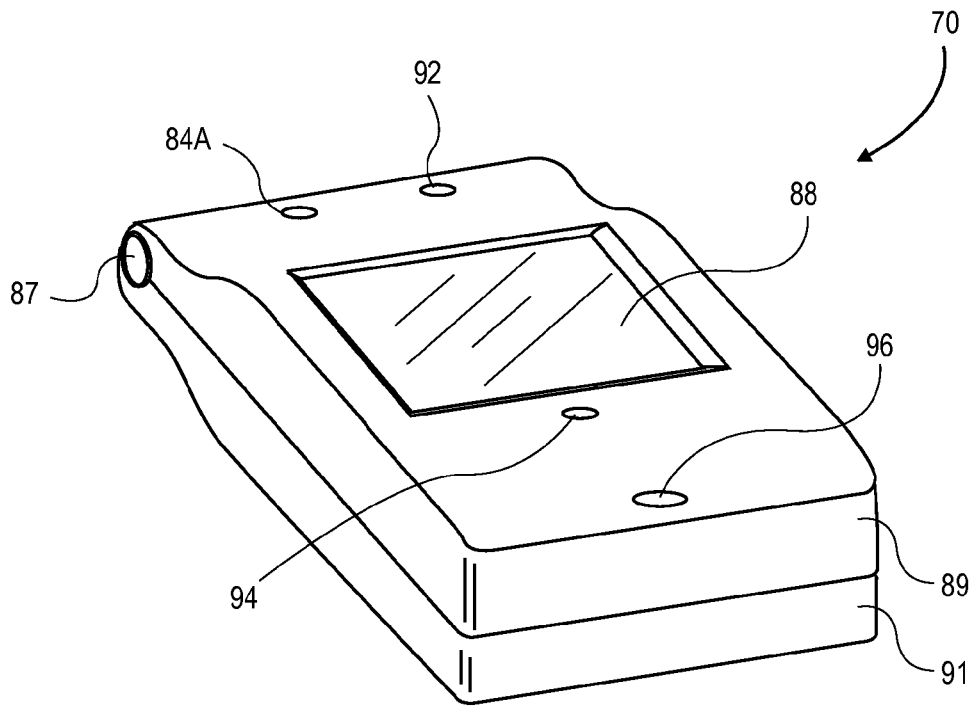
FIG. 5B is a perspective view of the portable device of FIG. 5A in a second configuration (e.g. a closed configuration) in accordance with one embodiment of the present invention.

FIGS. 5A and 5B illustrate a portable device 70 according to one embodiment of the invention. The portable device 70 may be a cellular telephone which includes a hinge 87 that couples a display housing 89 to a keypad housing 91. The hinge 87 allows a user to open and close the cellular telephone so that it can be placed in at least one of two different configurations shown in FIGS. 5A and 5B. In one particular embodiment, the hinge 87 may rotatably couple the display housing to the keypad housing. In particular, a user can open the cellular telephone to place it in the open configuration shown in FIG. 5A and can close the cellular telephone to place it in the closed configuration shown in FIG. 5B. The keypad housing 91 may include a keypad 95 which receives inputs (e.g. telephone number inputs or other alphanumeric inputs) from a user and a microphone 97 which receives voice input from the user. The display housing 89 may include, on its interior surface, a display 93 (e.g. an LCD) and a speaker 98 and a proximity sensor 84; on its exterior surface, the display housing 89 may include a speaker 96, a temperature sensor 94, a display 88 (e.g. another LCD), an ambient light sensor 92, and a proximity sensor 84A. Hence, in this embodiment, the display housing 89 may include a first proximity sensor on its interior surface and a second proximity sensor on its exterior surface. The first proximity sensor may be used to detect a user's head or ear being within a certain distance of the first proximity sensor and to cause an illumination setting of displays 93 and 88 to be changed automatically in response to this detecting (e.g. the illumination for both displays are turned off or otherwise set in a reduced power state). Data from the second proximity sensor, along with data from the ambient light sensor 92 and data from the temperature sensor 94, may be used to detect that the cellular telephone has been placed into the user's pocket.

In at least certain embodiments, the portable device 70 may contain components which provide one or more of the functions of a wireless communication device such as a cellular telephone, a media player, an entertainment system, a PDA, or other types of devices described herein. In one implementation of an embodiment, the portable device 70 may be a cellular telephone integrated with a media player which plays MP3 files, such as MP3 music files.

Figure 6:
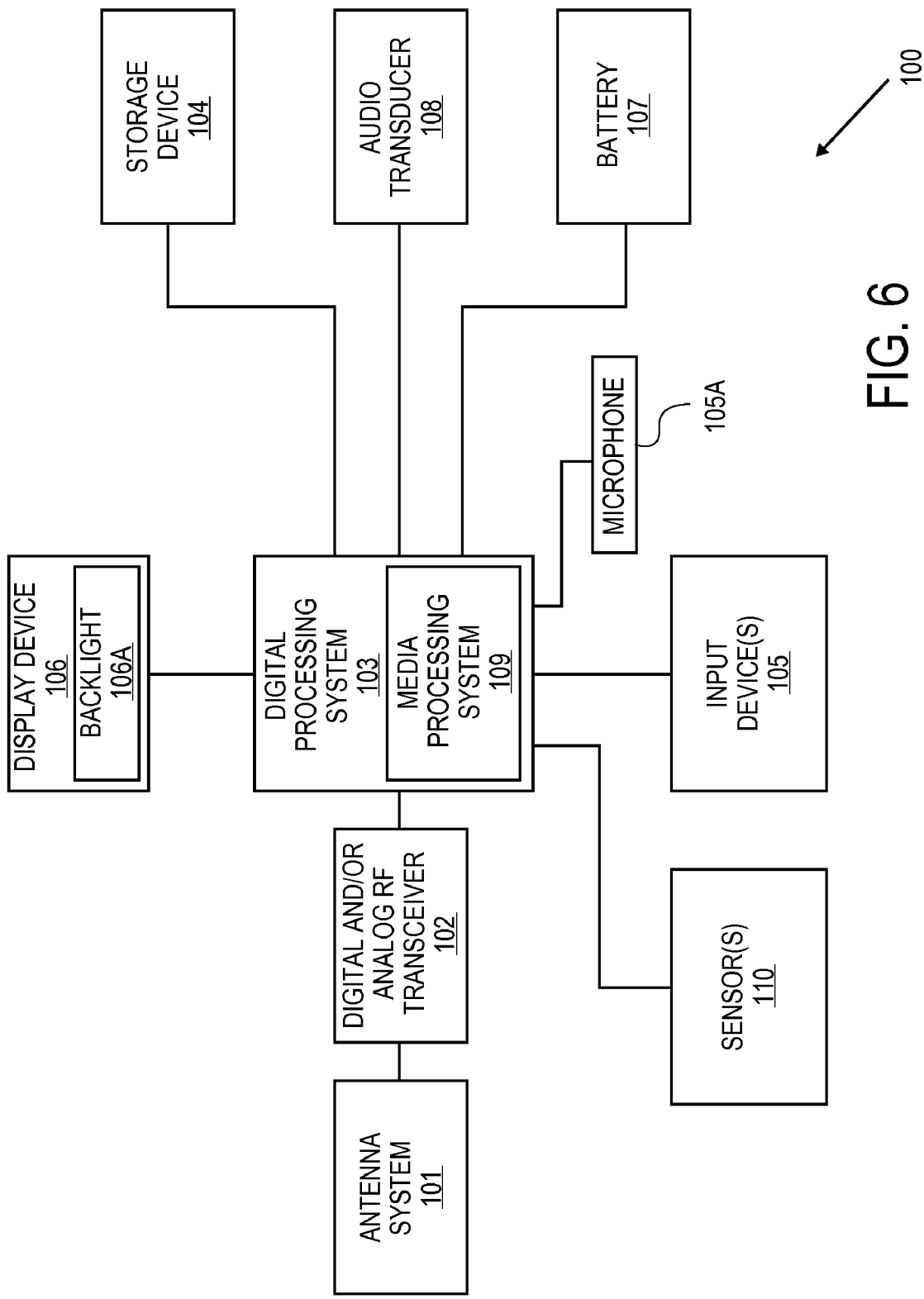
FIG. 6 is a block diagram of a system in which embodiments of the present invention can be implemented.

Each of the devices shown in FIGS. 2, 3, 4, 5A and 5B may be a wireless communication device, such as a cellular telephone, and may include a plurality of components which provide a capability for wireless communication. FIG. 6 shows an embodiment of a wireless device 100 which includes the capability for wireless communication. The wireless device 100 may be included in any one of the devices shown in FIGS. 2, 3, 4, 5A and 5B, although alternative embodiments of those devices of FIGS. 2-5B may include more or fewer components than the wireless device 100.

Wireless device 100 may include an antenna system 101. Wireless device 100 may also include a digital and/or analog radio frequency (RF) transceiver 102, coupled to the antenna system 101, to transmit and/or receive voice, digital data and/or media signals through antenna system 101.

Wireless device 100 may also include a digital processing system 103 to control the digital RF transceiver and to manage the voice, digital data and/or media signals. Digital processing system 103 may be a general purpose processing device, such as a microprocessor or controller for example. Digital processing system 103 may also be a special purpose processing device, such as an ASIC (application specific integrated circuit), FPGA (field-programmable gate array) or DSP (digital signal processor). Digital processing system 103 may also include other devices, as are known in the art, to interface with other components of wireless device 100. For example, digital processing system 103 may include analog-to-digital and digital-to-analog converters to interface with other components of wireless device 100. Digital processing system 103 may include a media processing system 109, which may also include a general purpose or special purpose processing device to manage media, such as files of audio data.

Wireless device 100 may also include a storage device 104, coupled to the digital processing system, to store data and/or operating programs for the wireless device 100. Storage device 104 may be, for example, any type of solid-state or magnetic memory device.

Wireless device 100 may also include one or more input devices 105, coupled to the digital processing system 103, to accept user inputs (e.g., telephone numbers, names, addresses, media selections, etc.) Input device 105 may be, for example, one or more of a keypad, a touchpad, a touch screen, a pointing device in combination with a display device or similar input device.

Wireless device 100 may also include at least one display device 106, coupled to the digital processing system 103, to display information such as messages, telephone call information, contact information, pictures, movies and/or titles or other indicators of media being selected via the input device 105. Display device 106 may be, for example, an LCD display device. In one embodiment, display device 106 and input device 105 may be integrated together in the same device (e.g., a touch screen LCD such as a multi-touch input panel which is integrated with a display device, such as an LCD display device). Examples of a touch input panel and a display integrated together are shown in U.S. published application No. 20060097991. The display device 106 may include a backlight 106a to illuminate the display device 106 under certain circumstances. It will be appreciated that the wireless device 100 may include multiple displays.

Wireless device 100 may also include a battery 107 to supply operating power to components of the system including digital RF transceiver 102, digital processing system 103, storage device 104, input device 105, microphone 105A, audio transducer 108, media processing system 109, sensor (s) 110, and display device 106. Battery 107 may be, for example, a rechargeable or non-rechargeable lithium or nickel metal hydride battery.

Wireless device 100 may also include audio transducers 108, which may include one or more speakers, and at least one microphone 105A.

Wireless device 100 may also include one or more sensors 110 coupled to the digital processing system 103. The sensor (s) 110 may include, for example, one or more of a proximity sensor, accelerometer, touch input panel, ambient light sensor, ambient noise sensor, temperature sensor, gyroscope, a hinge detector, a position determination device, an orientation determination device, a motion sensor, a sound sensor, a radio frequency electromagnetic wave sensor, and other types of sensors and combinations thereof. Based on the data acquired by the sensor(s) 110, various responses may be performed automatically by the digital processing system, such as, for example, activating or deactivating the backlight 106a, changing a setting of the input device 105 (e.g. switching between processing or not processing, as an intentional user input, any input data from an input device), and other responses and combinations thereof.

In one embodiment, digital RF transceiver 102, digital processing system 103 and/or storage device 104 may include one or more integrated circuits disposed on a printed circuit board (PCB).

Figure 7B:
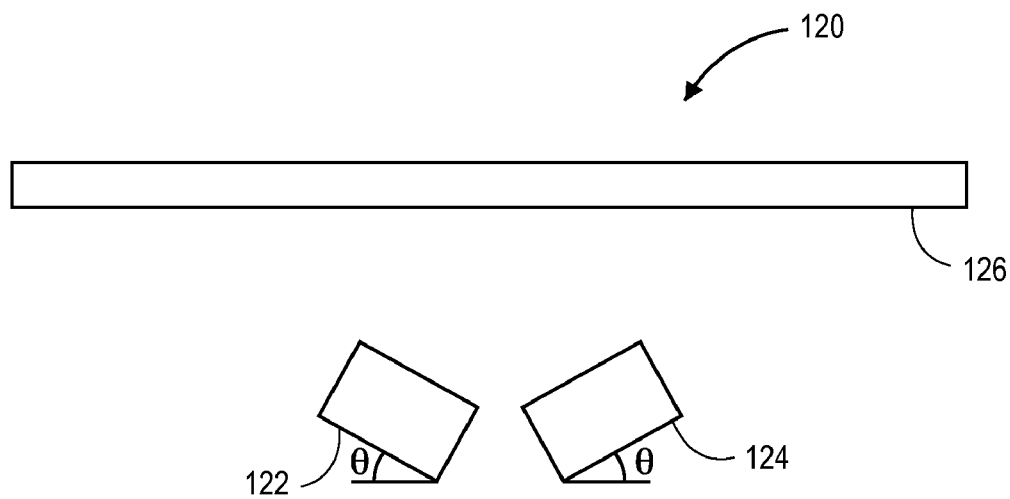
FIG. 7B is a schematic side view of an alternative proximity sensor in accordance with one embodiment of the present invention.

FIGS. 7A and 7B illustrate exemplary proximity sensors in accordance with embodiments of the invention. It will be appreciated that, in alternative embodiments, other types of proximity sensors, such as capacitive sensors or sonar-like sensors, may be used rather than the proximity sensors shown in FIGS. 7A and 7B. In FIG. 7A, the proximity sensor 120 includes an emitter 122, a detector 124, and a window 126. The emitter 122 generates light in the infrared (IR) bands, and may be, for example, a Light Emitting Diode (LED). The detector 124 is configured to detect changes in light intensity and may be, for example, a phototransistor. The window 126 may be formed from translucent or semi-translucent material. In one embodiment, the window 126 is an acoustic mesh, such as, for example, a mesh typically found with a microphone or speaker of the portable device. In other embodiments, the window 126 may be MicroPerf, IR transparent strands wound in a mesh, or a cold mirror.

During operation, the light from the emitter 122 hits an object 128 and scatters when the object is present above the window 126. The light from the emitter may be emitted in square wave pulses which have a known frequency, thereby allowing the detector 124 to distinguish between ambient light and light from emitter 122 which is reflected by an object, such as the user's head or ear or a material in a user's pocket, back to the detector 124. At least a portion of the scattered light is reflected towards the detector 124. The increase in light intensity is detected by the detector 124, and this is interpreted by a processing system (not shown in FIG. 7A) to mean an object is present within a short distance of the detector 124. If no object is present or the object is beyond a certain distance from the detector 124, an insufficient or smaller amount of the emitted light is reflected back towards the detector 124, and this is interpreted by the processing system (not shown in FIG. 7A) to mean that an object is not present or is at a relatively large distance. In each case, the proximity sensor is measuring the intensity of reflected light which is related to the distance between the object which reflects the light and detector 124.

In one embodiment, the emitter 122 and detector 124 are disposed within the housing of a portable device, as described above with reference to FIGS. 2-5B.

In FIG. 7B, the emitter 122 and detector 124 of the proximity sensor are angled inward towards one another to improve detection of the reflected light, but the proximity sensor of FIG. 7B otherwise operates in a manner similar to the proximity sensor of FIG. 7A.

It will be appreciated that at least some of the sensors which are used with embodiments of the inventions may determine or provide data which represents an analog value. In other words, the data represents a value which can be any one of a set of possible values which can vary continuously or substantially continuously, rather than being discrete values which have quantum, discrete jumps from one value to the next value. Further, the value represented by the data may not be predetermined. For example, in the case of a distance measured by a proximity sensor, the distance is not predetermined, unlike values of keys on a keypad which represent a predetermined value. For example, a proximity sensor may determine or provide data that represents a distance which can vary continuously or nearly continuously in an analog fashion; in the case of such a proximity sensor, the distance may correspond to the intensity of reflected light which originated from the emitter of the proximity sensor. A temperature sensor may determine or provide data that represents a temperature, which is an analog value. A light sensor, such as an ambient light sensor, may determine or provide data that represents a light intensity which is an analog value. A motion sensor, such as an accelerometer, may determine or provide data which represents a measurement of motion (e.g. velocity or acceleration or both). A gyroscope may determine or provide data which represents a measurement of orientation (e.g. amount of pitch or yaw or roll). A sound sensor may determine or provide data which represents a measurement of sound intensity. For other types of sensors, the data determined or provided by the sensor may represent an analog value.

Figure 8:
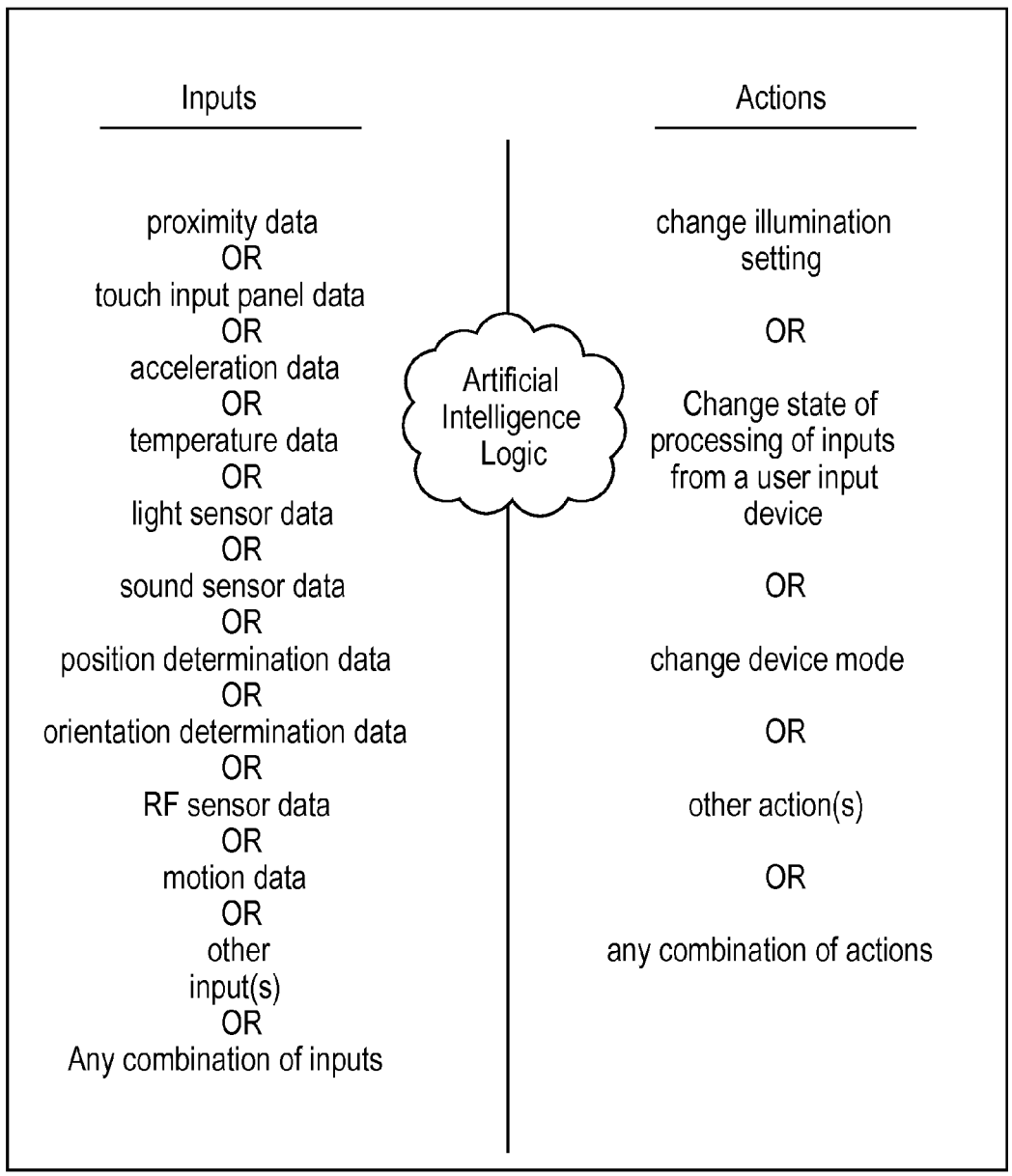
FIG. 8 is a block diagram of inputs and outputs for logic, such as artificial intelligence logic, in accordance with embodiments of the present invention.

FIG. 8 shows a diagram of various inputs from sensors that can be used and actions that can be performed in accordance with at least one embodiment of the invention. Any one of the devices described herein, including the devices shown in FIGS. 2, 3, 4, 5A and 5B, may operate in accordance with the use of artificial intelligence as represented by FIG. 8. One or more inputs on the left side of FIG. 8 are received from various sensors of a device and are input into the artificial intelligence (AI) logic. One or more actions on the right side of FIG. 8 may be implemented by the AI logic automatically in response to any combination of the inputs. In one implementation of this embodiment, the actions are implemented substantially immediately after the data is sensed by one or more sensors.

Exemplary inputs of FIG. 8 may include, for example, proximity data, proximity data and blob detect data (e.g., from a multipoint touch input screen), proximity data and accelerometer data, accelerometer data and blob detect data, proximity data and temperature data, proximity data and ambient light data, and numerous other possible combinations.

Exemplary actions of FIG. 8 may include, for example, turning off the backlight of the portable device's display, suppressing the user's ability to input at the user interface (e.g., locking the input device), changing the telephone's mode, and the like. It will be appreciated that combinations of the above actions may also be implemented by the AI logic. For example, the AI logic may both turn off the display's backlight and suppress the user's ability to input at the user interface.

Figure 11A:
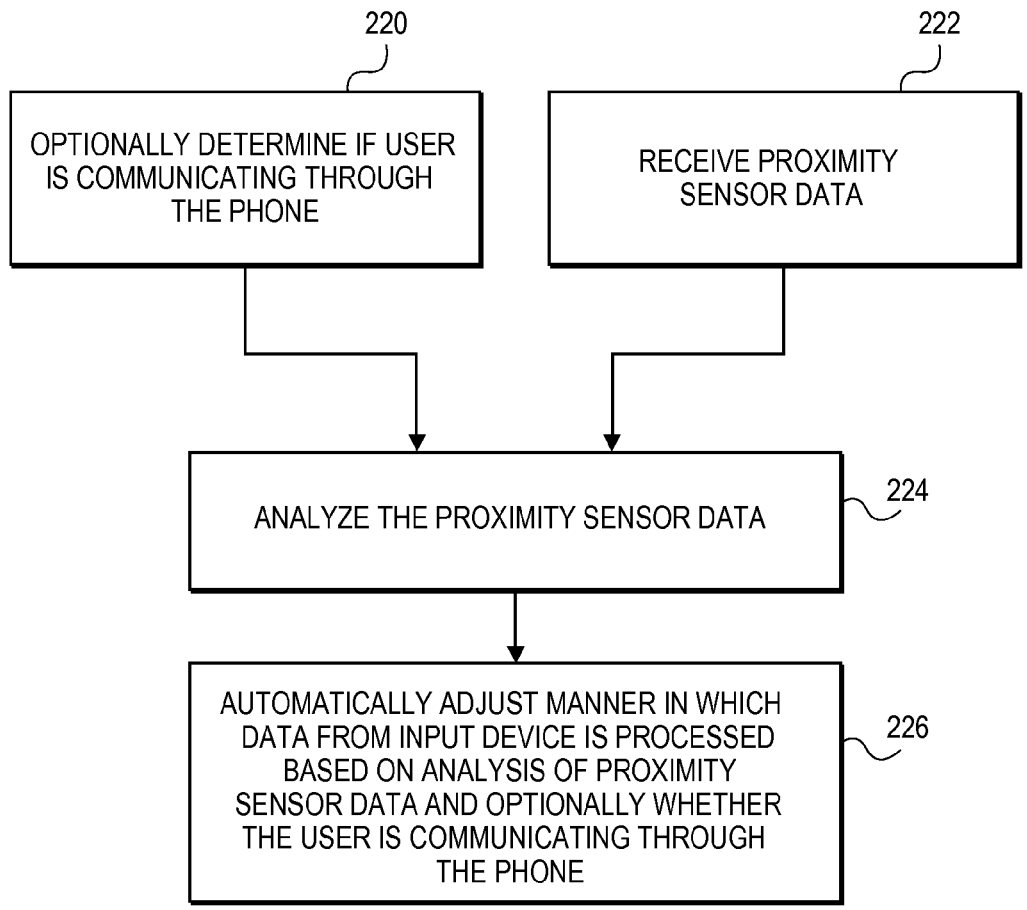
FIGS. 11A-F are flow charts of combinations of sensing to determine user activity and performing automated responses in accordance with embodiments of the present invention.

AI logic of FIG. 8 performs an AI (artificial intelligence) process. In certain embodiments, the AI process may be performed without a specific, intentional user input or without user inputs having predetermined data associated therewith (e.g., key inputs). The artificial intelligence process performed by the AI logic of FIG. 8 may use a variety of traditional AI logic processing, including pattern recognition and/or interpretation of data. For example, the AI logic may receive data from one or more sensors and compare the data to one or more threshold values and, based on those comparisons, determine how to interpret the data. In one embodiment, a threshold value may represent a distance which is compared to a value derived from a light intensity measurement in a proximity sensor. A light intensity measurement which represents a distance larger than the threshold value indicates that the object (which reflected the emitter's light) is not near, and a light intensity measurement which represents a distance smaller than the threshold value indicates that the object is near. Further, the input data may be subject to at least two interpretations (e.g. the data from a proximity sensor indicates that the user's head is near to the sensor, so turn off the back light, or the data from the proximity sensor indicates the user's head is not near, so leave the backlight under the control of a display timer), and the AI process attempts to select from the at least two interpretations to pick an interpretation that predicts a user activity. In response to the interpretation (e.g. the selection of one interpretation), the AI logic causes an action to be performed as indicated in FIG. 8, wherein the action may modify one or more settings of the device. In at least certain embodiments, the AI logic may perform an AI process which interprets the data from one or more sensors (which interpretation requires the AI process to select between at least two possible interpretations) and which selects an action (e.g. modifying a setting of the device) based on both the interpretation of the sensor data and the current state of the device; the method shown in FIG. 11A is an example of the use of information about the current state of the device (e.g. whether the user is currently communicating through the telephone in the device) along with an interpretation of sensor data (proximity data in the case of FIG. 11A).

In certain embodiments, the AI process may perform traditional methods of pattern recognition on the sensor data. For example, the rate of change of the distance between the device and the user's ear may have a pattern (e.g. revealing a deceleration as the user moves the device closer to their ear), and this pattern in the rate of change of distance may be detected by a pattern matching algorithm. The phrase "artificial intelligence" is used throughout to mean that a conclusion (whether explicit or implicit) can be drawn from data available from one or more sensors about a mode of usage by the user of the device. This conclusion may or my not be expressed in the device (e.g., "the user is talking on the phone") but it will be mapped to specific actions or settings for the device that would be appropriate if the user was using the device in that way. For example, a telephone may be pre-programmed such that whenever it detects (1) a voice being spoken into the microphone, (2) that the phone is connected to a network, and (3) the proximity sensor is active, then the screen backlight will be dimmed. Such pre-programming may involve simple logic (e.g. simple combinatorial logic), but would nonetheless be within the scope of artificial intelligence as used herein. While learning, statistical analysis, iteration, and other complex aspects of AI can be used with the present invention, they are not required for the basic artificial intelligence contemplated. Likewise, the word "analyze" does not imply sophisticated statistical or other analysis, but may involve observation of only a single threshold or datum.

The AI processing, in at least certain embodiments, may be performed by a processor or processing system, such as digital processing system 103, which is coupled to the one or more sensors that provide the data which form the inputs to the AI process. It will be appreciated that an AI process may be part of one or more of the methods shown in FIGS. 10 and 11A-11F.

In at least certain embodiments, the device, which operates according to any of those methods, may have at least one input device (e.g. a keypad or keyboard or touch input panel) which is designed to receive intentional user inputs (e.g. which specify a specific user entry) in addition to one or more sensors which are distinct and separate from the at least one input device and which sensors are not designed to receive intentional user inputs. In fact, a user may not even be aware of the presence of the one or more sensors on the device.

Figure 9A:
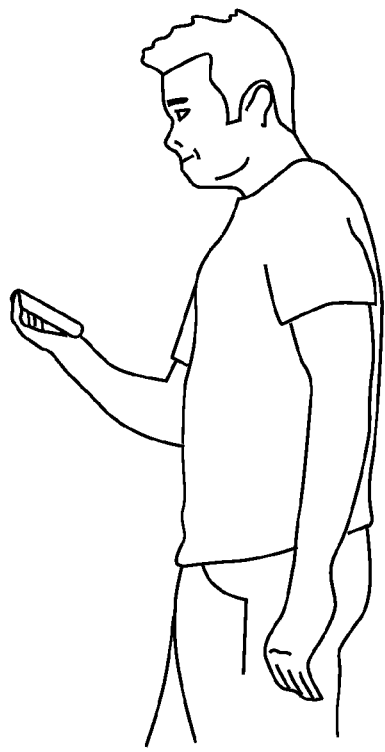
FIGS. 9A-C are views of user activities in accordance with embodiments of the present invention.
Figure 9B:
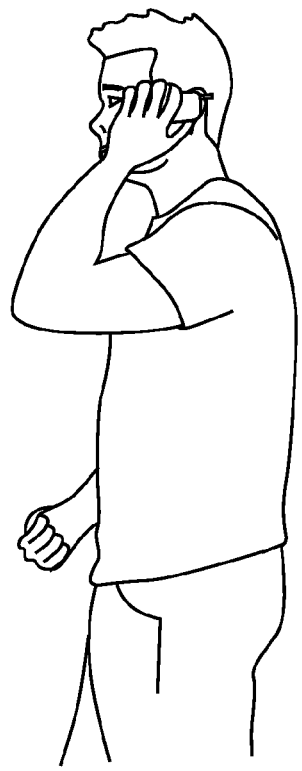
Figure 9C:
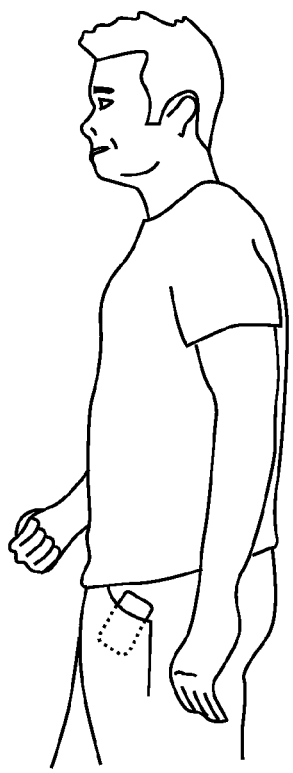

FIGS. 9A-C illustrate exemplary user activities that can be determined based on input data acquired by the one or more sensors of the portable device. Exemplary user activities include, but are not limited to, the user looking directly at the portable device (FIG. 9A), the user holding the portable device at or near their ear (FIG. 9B), the user putting the portable device in a pocket or purse (FIG. 9C), and the like.

Additional information about user activities and/or gestures that can be monitored in accordance with embodiments of the present invention are disclosed in U.S. patent application Ser. No. 10/903,964, titled "GESTURES FOR TOUCH SENSITIVE INPUT DEVICES," filed Jul. 30, 2004, U.S. patent application Ser. No. 11/038,590, titled "MODE-BASED GRAPHICAL USER INTERFACES FOR TOUCH SENSITIVE INPUT DEVICES," filed Jan. 18, 2005, all of which are incorporated herein by reference in their entirety.

Figure 10:
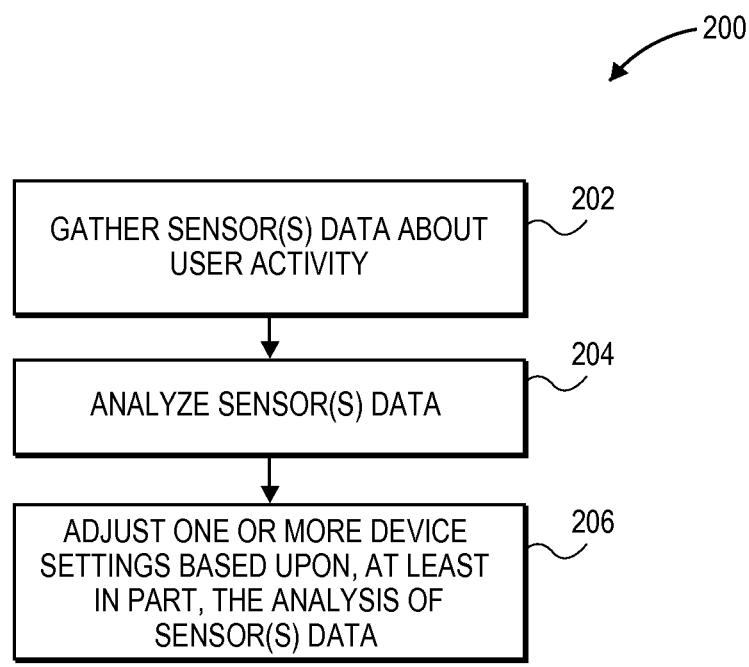
FIG. 10 is a flow chart of a method that includes automated responses to user activity in accordance with embodiments of the present invention.

FIG. 10 is a flowchart illustrating a method 200 for automatically responding to certain user activities with respect to a portable device. In one embodiment, method 200 includes, but is not limited to, gathering sensor data designed to indicate user activity with respect to a portable device, and executing machine-executable code to perform one or more predetermined automated actions in response to the detection of the user activity.

The method 200 may be performed by any one of the devices shown in FIGS. 2, 3, 4, 5A, 5B, 6 and 12 and may or may not use the artificial intelligence process shown in FIG. 8. Operation 202 gathers sensor data, from one or more sensors; the sensor data provides information about user activity. For example, a proximity sensor may indicate whether the device is near the user's ear; a temperature sensor, an ambient light sensor (or a differential ambient light sensor) and a proximity sensor may together indicate that the device is in the user's pocket; a gyroscope and a proximity sensor may together indicate that the user is looking at the device. In operation 204, the data from the one or more sensors is analyzed; this analysis may be performed by one or more processors within the device, including a processor within one or more of the sensors. The analysis attempts to predict user activity based on the sensor data. It will be appreciated that a prediction from this analysis may, in some cases, be wrong. For example, if a user places a finger over a proximity sensor when the user holds the device, this may cause the analysis to incorrectly conclude that the device is near the user's head or ear. In operation 206, one or more device settings may be adjusted based upon, at least in part, the analysis of the data from the one or more sensors. This adjusting may include changing an illumination setting of the device or other actions described herein.

FIGS. 11A-F illustrate exemplary methods for sensing data and automatically responding to the sensed data, and these methods may be performed by any one of the devices shown in FIGS. 2, 3, 4, 5A, 5B, 6 and 12 and may or may not use the artificial intelligence process shown in FIG. 8. It will be appreciated that several variations can be made to the illustrated methods, including variations to the data sensed, analysis of the data and the response(s) to the sensed data.

The method of FIG. 11A includes optional operation 220 in which the device determines if the user is communicating through the telephone within the device. This may be performed by conventional techniques known in the art which can sense when a telephone call is in progress or when the user is otherwise communicating through the telephone or other communication device. In operation 222, proximity sensor data is received from one or more proximity sensors on the device. Then in operation 224, the proximity sensor data is analyzed. For example, the data is analyzed to determine whether an object, such as the user's ear or head, is near the device. This analysis is used to decide whether and how to adjust the device's settings as shown in operation 226. One or more settings of the device may be automatically adjusted based on the analysis of the proximity sensor data and optionally based on whether or not the user is communicating through the telephone or other communication device. For example, if the proximity sensor indicates that the device is near the user's head or ear and it has been determined that the user is communicating through the telephone, then the device determines that the user is talking or otherwise communicating on the telephone or other communication device by having the device next to the user's ear as shown in FIG. 9B. In this situation, the device automatically changes the manner in which data from one or more input devices is processed, such as suppressing a user's ability to make intentional inputs on an input device, such as a keypad or a touch input panel on the device. In addition to suppressing intentional inputs, the device may automatically adjust a power setting of one or more displays of the device. If, on the other hand, the device determines that the user is not communicating though the telephone while the proximity sensor data indicates that an object is near to the device, the device may decide not to modify an illumination setting of the display and to not suppress the user's ability to enter intentional user inputs on an input device. The suppressing of inputs may occur in one of a variety of ways. for example, inputs may be suppressed by turning off or reducing power to the input device such that it is not operational while in this mode; in another example, inputs may be suppressed while in this mode by not processing any inputs which are received by a fully powered input device; in yet another example, inputs are not processed as intentional inputs but are processed to confirm they are "blobs" resulting from touches or near touches on the input device. In the last example, even though an input appears to be an activation of a key (the "3" button on a keypad) or other user interface item, the input is not processed as an activation of that key but rather is processed to determine whether it is a "blob."

Figure 11B:
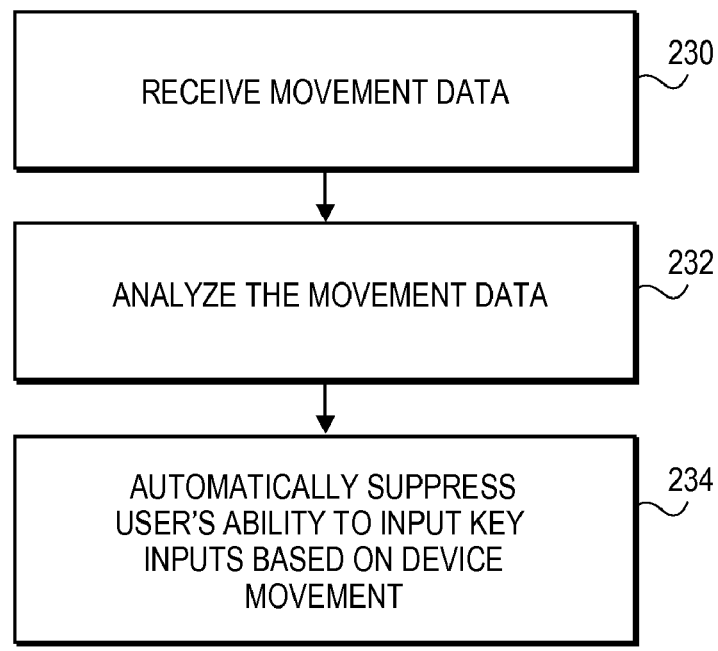

FIG. 11B shows a method of an embodiment of the present inventions which relates to a technique for controlling when data from an input device is processed as an input and when it is ignored as an intentional user input. In operation 230, the device receives movement data from one or more sensors. These sensors may include an accelerometer or a motion sensor or other types of sensors which indicate movement data. These sensors may be designed to distinguish between rapid movements and slow movements. This is particularly true if the movements involve high levels of acceleration. It is assumed in this embodiment that rapid movements may be so rapid that it is unlikely the user could be intending to enter a user input and hence the device may decide to ignore inputs which occur when such sensors indicate that the movement is faster than a threshold movement value. The movement data is analyzed in operation 232 to determine whether or not to automatically suppress a user's ability to input key inputs or other inputs based on the device's movement. In operation 234, the device may automatically suppress a user's ability to enter inputs on an input device in response to the analysis in operation 232.

Figure 11C:
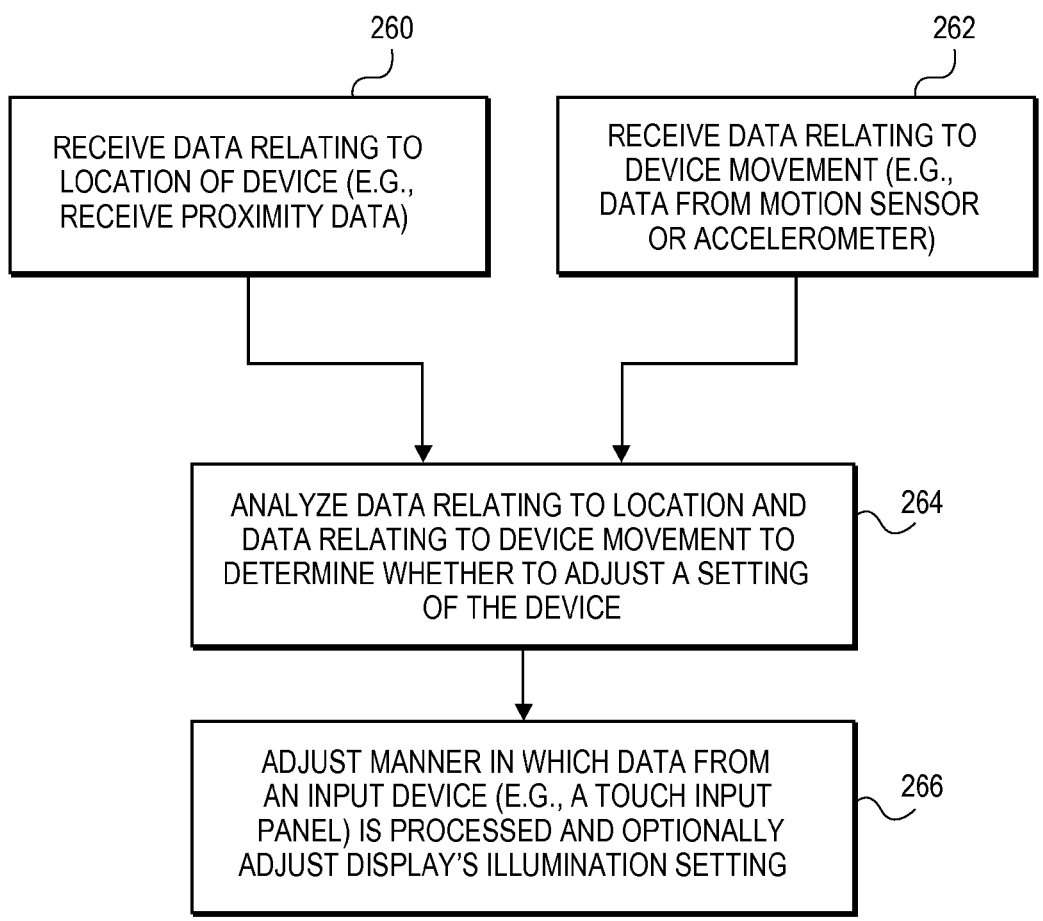

FIG. 11C relates to an embodiment of the present inventions in which data relating to a location of the device and data relating to movement of the device are analyzed to determine whether or not to adjust one or more settings of the device. In operation 260, data relating to the location of the device is received; this data may, for example, be provided by a proximity sensor. In operation 262, data relating to device movement is also received. This data may be from a motion sensor or from an accelerometer. In operation 264, the data relating to location and the data relating to device movement are analyzed to determine whether or not to adjust a setting of the device. This analysis may be performed in a variety of different ways. For example, the data relating to device motion may show a pattern of movement which matches the movement which occurs when a user moves the device from the user's pocket to the user's head. The analysis may further determine that the proximity data or other data relating to location showed that the device was not near the user's head or another object until near the end of the movement. In such a situation, the analysis would determine that the user has pulled the device from their pocket and placed it against the user's ear. In operation 266, one or more settings of the device are adjusted automatically, without any intentional user input, based upon the analysis. For example, an adjustment may be made in the manner in which data from an input device, such as a touch input panel, is processed. For example, inputs to the input device are not processed as intentional user inputs, effectively suppressing the inputs. In addition, a display's illumination setting may be adjusted. For example, if the analysis of operation 264 determines the user has moved the device from a location away from the ear to a location close to the ear then, in one embodiment, an illumination setting may be adjusted and the user's ability to enter intentional inputs into an input device may be suppressed.

Figure 11D:
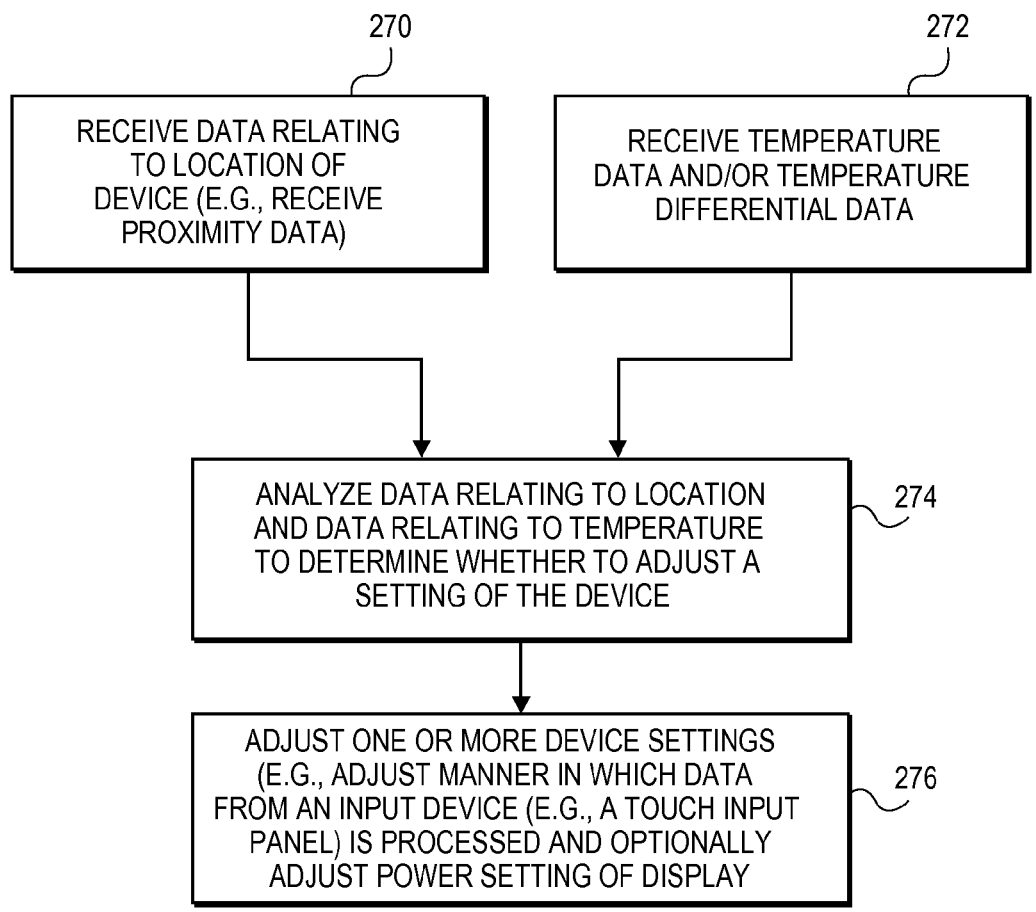

FIG. 11D shows an embodiment of the present inventions in which data relating to location and data relating to temperature is processed through an analysis to determine whether or not to adjust one or more device settings of the device. In operation 270, data relating to location, such as data from a proximity sensor, is received. In operation 272, data relating to temperature, such as temperature data or temperature differential data, is received. In operation 274, the data relating to location and the data relating to temperature are analyzed to determine whether to adjust one or more settings of the device. In operation 276, one or more device settings are adjusted in response to the analysis of operation 274.

Figure 11E:
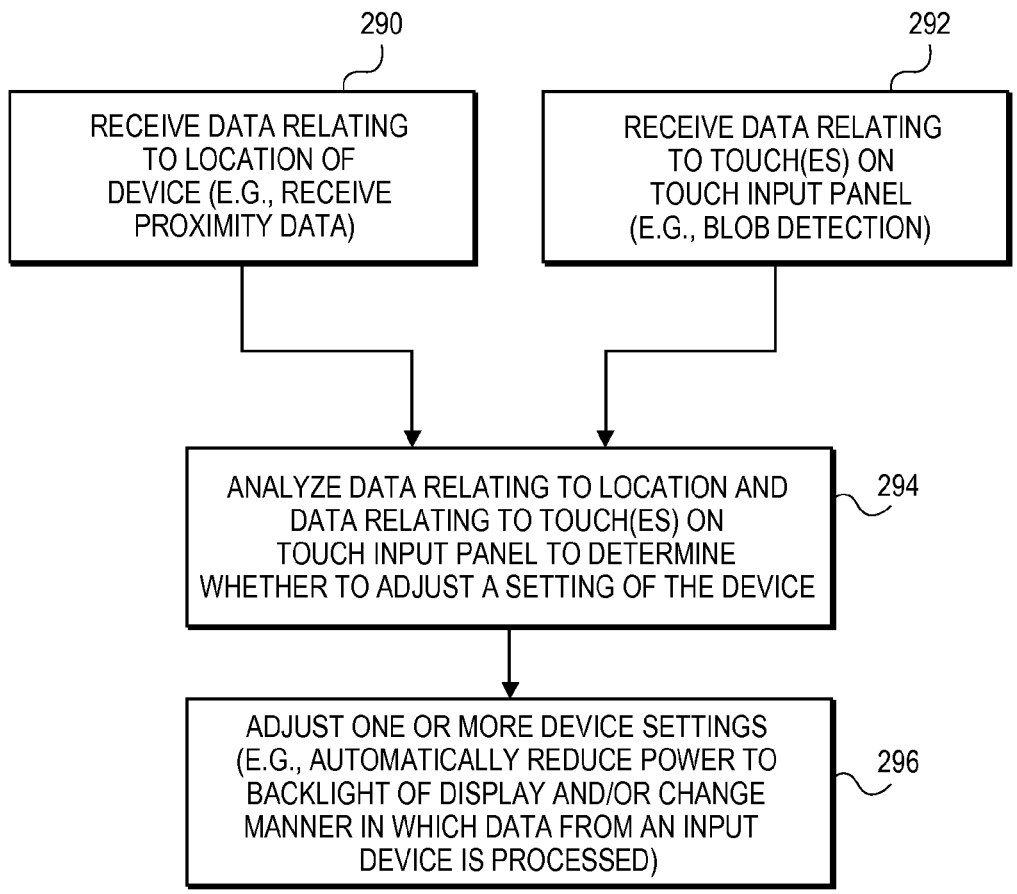

FIG. 11E shows an embodiment of the present inventions in which data relating to location of a device and data relating to touches on a touch input panel of the device are analyzed to determine whether to adjust a setting of the device. In this embodiment, data relating to location of the device is received in operation 290 and data relating to touches on a touch input panel is received in operation 292. The data relating to location may be from a proximity sensor. The data relating to touches on a touch input panel may be from a multi-point touch input panel which is capable of detecting multiple point touches which may occur when a user's face is pressed against or is otherwise near the touch input panel. In operation 294, the data relating to location and the data relating to touches are analyzed to determine whether to adjust a setting of the device. As a result of this analysis, in operation 296, one or more device settings are adjusted. For example, the adjustment may include automatically reducing power to the backlight of a display or changing the manner in which data from the touch input panel is processed, or both adjustments.

A mode of the device may be used in order to determine whether to or how to adjust a setting of the device. The mode of the device may include any one of a variety of modes or conditions, such as speakerphone mode or non-speakerphone mode, battery powered mode or not battery powered mode, call waiting mode or not call waiting mode, an alert mode in which the device may make a sound, such as the sound of an alarm, etc. The data relating to user activity (e.g. data from one or more sensors, such as a proximity sensor and/or a touch input panel, which is capable of detecting blobs from a face) is analyzed relative to the mode of the device and the analysis attempts to determine whether to adjust a setting of the device. One or more device settings may be adjusted based on the sensed user activity and the device mode. For example, the device may automatically switch from speakerphone mode to non-speakerphone mode when proximity data, and optionally other data (e.g. data from a motion sensor and an ambient light sensor) indicate the user has placed the device, which in this case may be a telephone, next to the user's ear. In this example, the device has automatically switched from speakerphone mode to non-speakerphone mode without any intentional input from the user which indicates that the switch should occur. Another method involves adjusting an alert or alarm volume depending on whether or not the device is near to the user's ear. In this example, if the data relating to user activity indicates that the device is adjacent to the user's ear and if the mode of the device is set such that alarms or alerts will cause the device to make a sound, then the device will automatically change the volume level for an alert or an alarm from a first level to a second level which is not as loud as the first level.

Figure 11F:
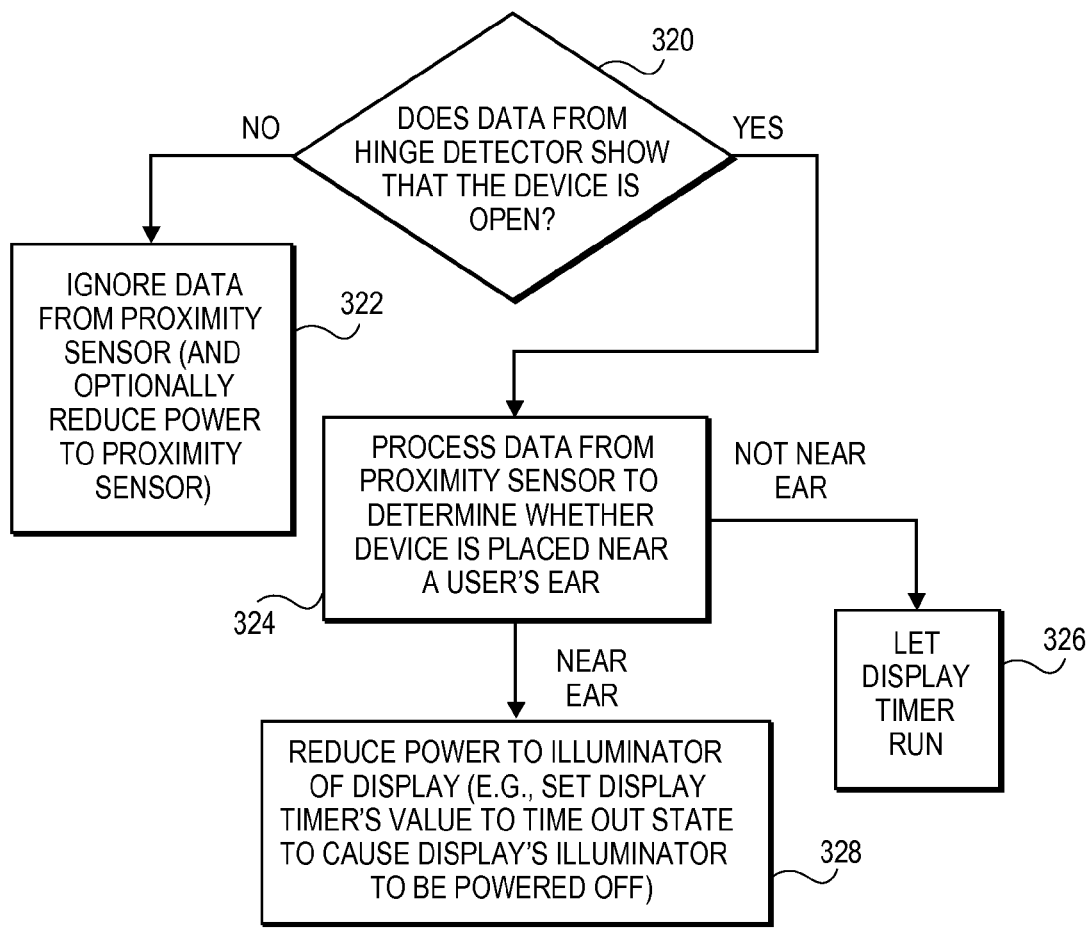

FIG. 11F shows an embodiment of the inventions in which data from a device configuration detector, such as a hinge detector, is used to determine how to process data from one or more sensors on the device. In one embodiment, this method shown in FIG. 11F may be used with the device shown in FIGS. 5A and 5B (and the proximity sensor referred to in FIG. 11F may be proximity sensor 84 in FIG. 5A). In particular, a hinge detector which is coupled to the hinge 87 may detect whether the device is open as shown in FIG. 5A or closed as shown in FIG. 5B. Other configuration detectors may indicate whether a slide out input device (e.g. a slide out keyboard) or other type of input device has been pulled out (or swung out) or not from a portion of the device. In operation 320, the device determines whether data from a hinge detector shows that the device is open. If the device is not open, then in operation 322, data from a proximity sensor is ignored if the proximity sensor is disposed on an interior surface of the device. Optionally, the power to the proximity sensor may be reduced by, for example, turning off the proximity sensor when the device is in a closed state. If it is determined in operation 320 that the device is open, then in operation 324, data from the proximity sensor is processed to determine whether the device is placed near an object, such as the user's ear. If it is determined from the processing of operation 324 that the device is not near the user's ear, then the display timer which controls the time that the display is illuminated, is allowed to continue to run in operation 326. This display timer may be similar to the display timer which operates in the method shown in FIG. 1. If, in operation 324, it is determined that the device is near the user's ear, then in operation 328, power to an illuminator of the display is reduced. This may be performed by setting the display timer's value to a time out state to thereby cause the display's illuminator to be powered off. It will be appreciated that the method of FIG. 11F may save additional battery life by reducing power to the illuminator of the display before the display timer runs out.

It will be appreciated that a method which is similar to the method shown in FIG. 1 may be used in addition to at least certain embodiments of the inventions which adjust illumination settings. For example, in the embodiment shown in FIG. 11A, a display timer which has been started (e.g. in operation 14 of FIG. 1) may continue to count while the method shown in FIG. 11A is performed. The display timer will count, while the method of FIG. 11A is being performed, until its time out state is reached and, upon doing so, the display timer may cause the illumination setting to be changed before the method of FIG. 11A is completed. In this case, the illumination setting is controlled by both the display timer and one or more sensors of at least certain embodiments of the inventions which cause an adjusting of illumination settings based upon the analysis of data from one or more sensors.

The phrase "proximity sensor" is used throughout to mean a sensor, such as a capacitive, temperature, inductive, infrared or other variety of sensor, which is capable of detecting whether an object is present within a certain distance of the sensor. A primary object of this detecting may be the head of the user (or any other object that would present viewing of the display screen).

Any of the embodiments of the inventions may include one or more user interface controls which allow a user to override a result caused by one or more sensors. For example, a control, such as a button, may be pressed by the user to cause the display to return to full power after a proximity sensor has caused the display to enter a reduced power consumption state. In another example, the user interface control may be a sensor (or group of sensors), such as an accelerometer, which detects a user interaction with the device (e.g. shaking the device), and the user interaction has been set up to cause an overriding of a state caused by one or more sensors.

Certain embodiments of the inventions may employ one or more light sensors which provide data relating to light, which data is analyzed to determine whether or not to adjust one or more settings of a device, such as wireless device 100. Ambient light level data may be provided by an ambient light sensor which indicates the level of light intensity surrounding that sensor. Ambient light differential data may be obtained form two or more ambient light sensors which are disposed at different positions on the device. For example, one ambient light sensor may be on one side of the device, and another ambient light sensor may be on another side of the device. A different in the light intensity levels may be determined by comparing the data from these two ambient light sensors on two different sides or surfaces of the device. There are a variety of possible uses of a light sensor. A light sensor may be used with a proximity sensor to determine when a device is placed in a pocket to cause the device to be set in vibrate mode only or vibrate mode with audible ringing. In another example, in response to a light sensor determining that the ambient light is very low, and optionally in response to a user having set the device to visibly light up to show an incoming call when the ambient light is very low, the device may automatically be put in a "light ring" mode when it is dark so that instead of an audible ring from the device, the display flashes visibly (e.g. by repeatedly turning on and off the backlight) to indicate an incoming call. Another exemplary use of a light sensor involves using it as an alarm indicating that a dark room (or environment) has become brighter (e.g. the sun has risen or a door to a darkened room is opened to let light into the room). A light sensor may also be used to cause a device to automatically act as a source of light (e.g. as a flashlight, in effect) upon sensing a low ambient light level.

Figure 12:
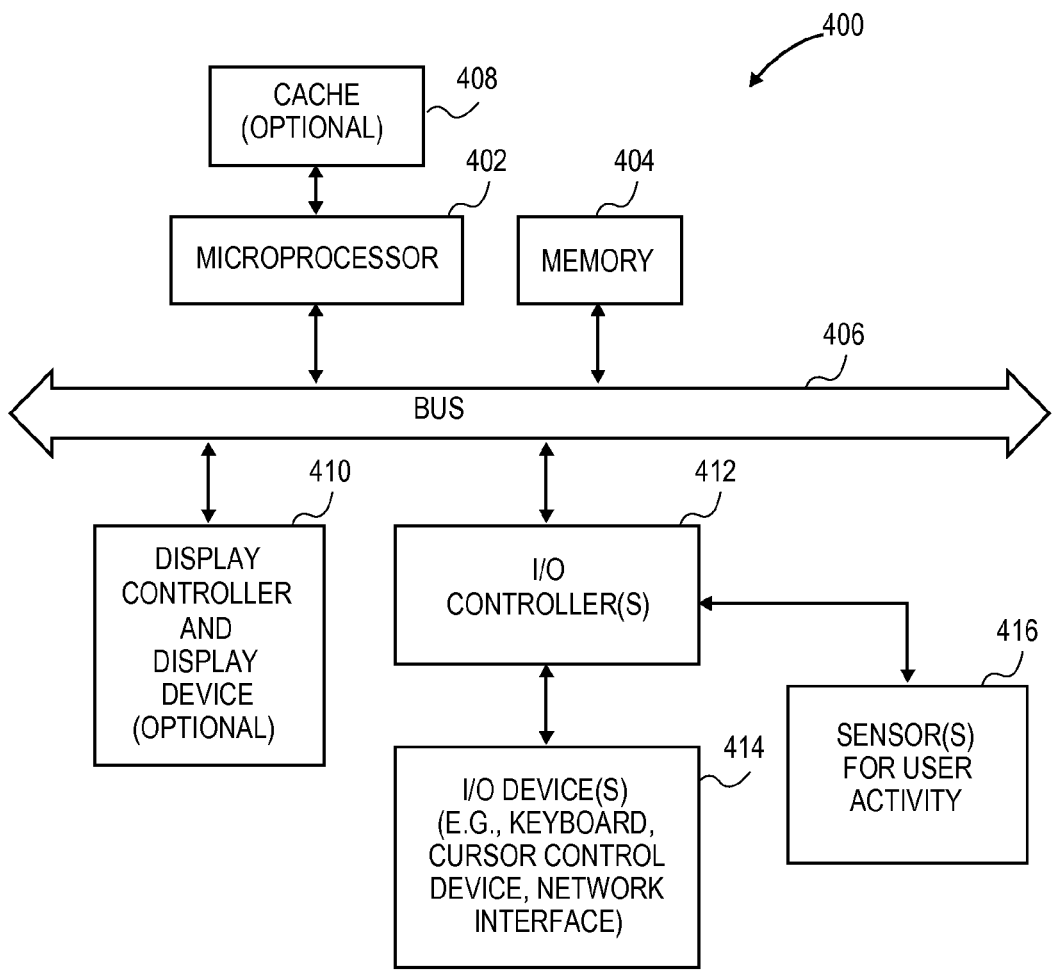
FIG. 12 is a block diagram of a digital processing system in accordance with one embodiment of the present invention.

FIG. 12 shows another example of a device according to an embodiment of the inventions. This device may include a processor, such as microprocessor 402, and a memory 404, which are coupled to each other through a bus 406. The device 400 may optionally include a cache 408 which is coupled to the microprocessor 402. This device may also optionally include a display controller and display device 410 which is coupled to the other components through the bus 406. One or more input/output controllers 412 are also coupled to the bus 406 to provide an interface for input/output devices 414 and to provide an interface for one or more sensors 416 which are for sensing user activity. The bus 406 may include one or more buses connected to each other through various bridges, controllers, and/or adapters as is well known in the art. The input/output devices 414 may include a keypad or keyboard or a cursor control device such as a touch input panel. Furthermore, the input/output devices 414 may include a network interface which is either for a wired network or a wireless network (e.g. an RF transceiver). The sensors 416 may be any one of the sensors described herein including, for example, a proximity sensor or an ambient light sensor. In at least certain implementations of the device 400, the microprocessor 402 may receive data from one or more sensors 416 and may perform the analysis of that data in the manner described herein. For example, the data may be analyzed through an artificial intelligence process or in the other ways described herein. As a result of that analysis, the microprocessor 402 may then automatically cause an adjustment in one or more settings of the device.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A portable data processing device comprising:
   a display;
   an input device;
   a proximity sensor;
   at least one processor coupled to the input device and to the display and coupled to the proximity sensor to receive data from the proximity sensor;
   a radio frequency (RF) transceiver coupled to the processor;
   a speaker coupled to the RF transceiver;
   a microphone coupled to the RF transceiver;
   a storage device coupled to the at least one processor;
   an ambient light sensor (ALS) coupled to the at least one processor, wherein the at least one processor is configured to change the power setting of the display based upon data from the ALS;
   wherein the processor is configured to determine, based upon at least the data from the proximity sensor, whether to change a state of processing of data from the input device relative to receipt of user inputs;
   wherein the input device comprises a multi-touch input panel which is integrated with the display and which is capable of determining multiple, separate concurrent touches on the multi-touch input panel and wherein the multi-touch input panel provides touch data derived from one or more touches to the multi-touch input panel and wherein when the data from the proximity sensor determines a first proximity state, the touch data is processed as an intentional user input and when the data from the proximity sensor determines a second proximity state, the touch data is either not processed as an intentional user input or is not provided by the multi-touch input panel;
   wherein the second proximity state occurs when the portable data processing device is proximate to the user's ear;
   wherein the storage device is configured to store media for playback on the portable data processing device, and wherein the data from the proximity sensor represents at least one of a distance and a rate of change of distance; and
   wherein the at least one processor is configured to change the state of processing of the touch data from the multi-touch input panel in response to a change in the data from the proximity sensor.

2. The portable data processing device as in claim 1 wherein the display occupies a large portion of a surface of a housing of the portable device.

3. The portable data processing device as in claim 2 wherein the portable device does not include a hinge.

4. The portable data processing device as in claim 2 wherein the processor is configured to determine whether multiple concurrent touches resemble contact with a user's face.

5. The portable data processing device as in claim 4 further comprising:
a user interface coupled to the storage device, the user interface being configured to allow the user to select a particular content in the media for playback and to scroll through a listing of the media.

6. The portable data processing device as in claim 5 wherein the media for playback comprises at least one of audio or video or audio and video together.

7. The portable data processing device as in claim 6 wherein the processor is configured to determine whether a user is communicating with another device through the RF transceiver and is configured to determine whether to change the state of processing of data from the input device and to alter the power setting based on both the data and whether the user is communicating with another device and wherein data from the input device is not processed as an intentional user input when (a) the data from the proximity sensor indicates that the portable data processing device is near the user and (b) the user is communicating with another device.

8. The portable data processing device as in claim 7 wherein the state of processing of the data from the input device and the power setting of the display are both changed in response to a change in the data from the proximity sensor.

9. The portable data processing device as in claim 8 wherein the data from the proximity sensor represents a rate of change of distance; and
wherein the at least one processor is configured to change the state of processing of the touch data from the multi-touch input panel and the power setting of the display in response to a change in the data from the proximity sensor.

10. The portable data processing device as in claim 6 wherein the ambient light sensor (ALS) senses a level of ambient light and wherein the at least one processor is configured to change the illumination level of the display to dim the display based upon at least data from the ALS.

11. A portable data processing device comprising:
a display;
an input device;
a proximity sensor;
at least one processor coupled to the input device and to the display and coupled to the proximity sensor to receive proximity data from the proximity sensor
a radio frequency (RF) transceiver coupled to the processor;
a speaker coupled to the RF transceiver;
a microphone coupled to the RF transceiver;
a storage device coupled to the at least one processor;
an ambient light sensor (ALS) coupled to the at least one processor, wherein the at least one processor is configured to change the power setting of the display based upon data from the ALS;
wherein the processor is configured to determine, based on at least the proximity data, whether to change a state of processing of input data from the input device relative to receipt of user inputs;
wherein the input device comprises an input panel which is integrated with the display and which is capable of determining a touch on the input panel and wherein the input panel provides touch data and wherein when the data from the proximity sensor determines a first proximity state, the touch data is processed as an intentional user input and when the data from the proximity sensor determines a second proximity state, the touch data is either not processed as an intentional user input or is not provided by the input panel;
wherein the second proximity state occurs when the portable data processing device is proximate to the user's ear;
wherein the storage device is configured to store media for playback on the portable data processing device, and wherein the data from the proximity sensor represents at least one of a distance and a rate of change of distance; and
wherein the at least one processor is configured to change the state of processing of the touch data from the input panel in response to a change in the data from the proximity sensor.

12. The portable data processing device as in claim 11 wherein the display occupies a large portion of a surface of a housing of the portable device.

13. The portable data processing device as in claim 12 wherein the portable device does not include a hinge.

14. The portable data processing device as in claim 12 further comprising:
a user interface coupled to the storage device, the user interface being configured to allow the user to select a particular content in the media for playback and to scroll through a listing of the media.

15. The portable data processing device as in claim 14 wherein the processor is configured to determine whether a user is communicating with another device through the RF transceiver and is configured to determine whether to change the state of processing of data from the input device and to alter the power setting based on both the data and whether the user is communicating with another device and wherein data from the input device is not processed as an intentional user input when (a) the data from the proximity sensor indicates that the portable data processing device is near the user and (b) the user is communicating with another device.

16. The portable data processing device as in claim 15 wherein the state of processing of the data from the input device and the power setting of the display are both changed in response to a change in the data from the proximity sensor.

17. The portable data processing device as in claim 15 wherein the ambient light sensor (ALS) senses a level of ambient light and wherein the at least one processor is configured to change the illumination level of the display to dim the display based upon at least data from the ALS.

18. The portable data processing device as in claim 16 wherein the data from the proximity sensor represents a rate of change of distance; and
wherein the at least one processor is configured to change the state of processing of the touch data from the input panel and the power setting of the display in response to a change in the data from the proximity sensor.

* * * * *

UNITED STATES PATENT AND TRADEMARK OFFICE
CERTIFICATE OF CORRECTION

PATENT NO. : 7,633,076 B2
APPLICATION NO. : 11/586862
DATED : December 15, 2009
INVENTOR(S) : Huppi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 437 days.

Signed and Sealed this

Second Day of November, 2010

David J. Kappos
*Director of the United States Patent and Trademark Office*